(12) United States Patent (10) Patent No.: US 9,395,525 B2
Matsumoto et al. (45) Date of Patent: Jul. 19, 2016

(54) CATADIOPTRIC IMAGING LENS

(71) Applicant: Nikon Corporation, Chiyoda-ku, Tokyo (JP)

(72) Inventors: Miho Matsumoto, Tokyo (JP); Yoshikazu Hirayama, Chiba (JP); Kinya Kato, Tokyo (JP); Yoshikazu Sugiyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/144,443

(22) Filed: Dec. 30, 2013

(65) Prior Publication Data

US 2014/0211330 A1 Jul. 31, 2014

Related U.S. Application Data

(63) Continuation of application No. PCT/JP2012/066392, filed on Jun. 27, 2012.

(30) Foreign Application Priority Data

Jul. 1, 2011 (JP) .................................. 2011-146958

(51) Int. Cl.
*G02B 17/08* (2006.01)

(52) U.S. Cl.
CPC ........ *G02B 17/0804* (2013.01); *G02B 17/0816* (2013.01)

(58) Field of Classification Search
CPC ........... G02B 17/0621; G02B 17/0816; G02B 17/0832; G02B 17/0848; G02B 17/0852
USPC .................................. 359/365, 366, 728, 729
See application file for complete search history.

(56) References Cited

U.S. PATENT DOCUMENTS 6,466,383 B1 10/2002 Miyajima et al.
2004/0114255 A1 6/2004 Matsuo
(Continued)

FOREIGN PATENT DOCUMENTS

JP 11-212132 A 8/1999
JP 2001-100101 A 4/2001
(Continued)

OTHER PUBLICATIONS

Ozan Cakmakci, et al. "Head-Worn Displays: A Review" Sep. 2006, IEEE, Journal of Display Technology, vol. 2, No. 3, pp. 199-216.*

(Continued)

*Primary Examiner* — Thomas K Pham
*Assistant Examiner* — Marin Pichler
(74) *Attorney, Agent, or Firm* — Shapiro, Gabor and Rosenberger, PLLC

(57) ABSTRACT

A catadioptric imaging lens includes: a first reflecting mirror; a second reflecting mirror; and a lens group. A reflecting surface of the first reflecting mirror is a rotationally asymmetrical aspherical, with concavity on the object side within the reference and the first orthogonal plane. A reflecting surface of the second reflecting mirror is a rotationally asymmetrical aspherical, with convexity toward the first reflecting mirror within the reference and within the second orthogonal plane. A surface in the lens group closest to the second reflecting mirror is a rotationally asymmetrical aspherical, with concavity toward the second reflecting mirror within the reference plane and convexity toward the second reflecting mirror within the third orthogonal plane.

12 Claims, 20 Drawing Sheets

(56) References Cited

U.S. PATENT DOCUMENTS

| | | |
|---|---|---|
| 2004/0114256 A1 | 6/2004 | Matsuo |
| 2004/0156117 A1 | 8/2004 | Takaura et al. |
| 2004/0184152 A1 | 9/2004 | Matsunaga et al. |
| 2004/0196568 A1 | 10/2004 | Matsuo |
| 2005/0013021 A1 | 1/2005 | Takahashi et al. |
| 2006/0077567 A1 | 4/2006 | Matsuo |
| 2006/0126032 A1 | 6/2006 | Takaura et al. |
| 2007/0139623 A1 | 6/2007 | Hisada et al. |
| 2007/0279598 A1 | 12/2007 | Hisada et al. |
| 2008/0304019 A1 | 12/2008 | Takaura et al. |
| 2009/0015801 A1 | 1/2009 | Takaura et al. |
| 2009/0015910 A1 | 1/2009 | Takaura et al. |
| 2009/0021703 A1 | 1/2009 | Takaura et al. |
| 2010/0039625 A1 | 2/2010 | Takaura et al. |
| 2010/0283976 A1 | 11/2010 | Hisada et al. |

FOREIGN PATENT DOCUMENTS

| | | |
|---|---|---|
| JP | 2003-344772 A | 12/2003 |
| JP | 2004-226997 A | 8/2004 |
| JP | 2004-233907 A | 8/2004 |
| JP | 2005-003804 A | 1/2005 |
| JP | 2007-164007 A | 6/2007 |
| JP | 2007-322811 A | 12/2007 |
| JP | 2008-242025 A | 10/2008 |
| JP | 2008-242028 A | 10/2008 |
| JP | 2008-268978 A | 11/2008 |
| WO | WO 01/06295 A1 | 1/2001 |

OTHER PUBLICATIONS

International Search Report dated Aug. 7, 2014, in International Application No. PCT/JP2012/066392.

Written Opinion dated Aug. 7, 2014, in International Application No. PCT/JP2012/066392.

International Preliminary Report on Patentability, dated Jan. 16, 2014, in International Application No. PCT/JP2012/066392.

Office Action issued Mar. 16, 2015, in Japanese Patent Application No. 2011-146958.

* cited by examiner

FIG.2A
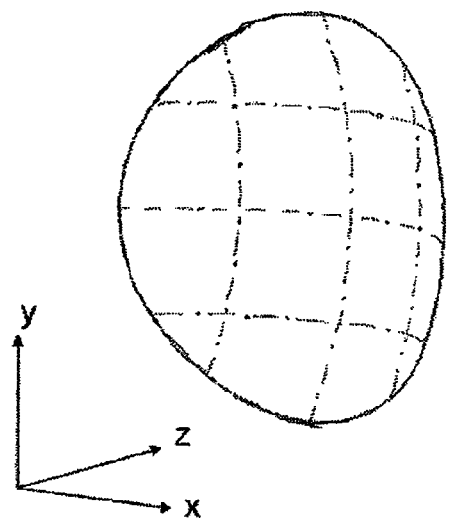
FIG.2B
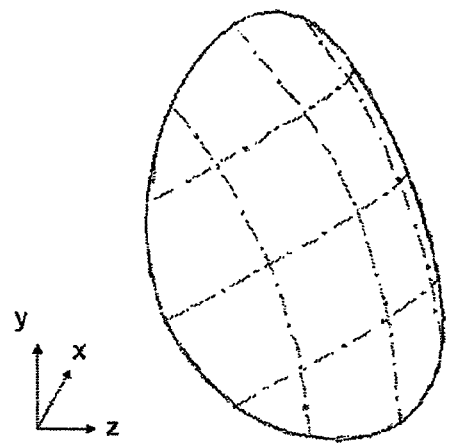
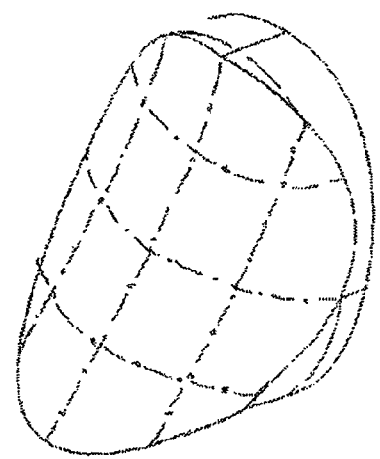
FIG.2C

CATADIOPTRIC IMAGING LENS

INCORPORATION BY REFERENCE

This application is a continuation of international application No. PCT/JP2012/066392 filed Jun. 27, 2012.
The disclosures of the following priority applications are herein incorporated by reference:
Japanese Patent Application No. 2011-146958 filed Jul. 1, 2011; International Application No. PCT/JP2012/066392 filed Jun. 27, 2012.

BACKGROUND OF THE INVENTION

1. Field of the Invention

The present invention relates to a catadioptric imaging lens.

2. Description of Related Art

Photographic lenses used in, for instance, cameras in the known art include catadioptric imaging lenses deemed advantageous in that they assure good correction of chromatic aberration while enabling system miniaturization. Japanese Laid Open Patent Publication No. H11-212132 discloses a catadioptric imaging lens that includes a concave reflecting mirror and a convex reflecting mirror disposed along a single optical axis extending on a straight line, and is configured as an optical system achieving rotational symmetry relative to the optical axis.

SUMMARY OF THE INVENTION

At a catadioptric imaging lens in the related art, a light flux, having departed an object (photographic subject) has a central portion thereof blocked at a convex reflecting mirror, is then sequentially reflected at a concave reflecting mirror and the convex reflecting mirror, each having a central opening area, and reaches an image plane via the opening area of the concave reflecting mirror. Thus, the central portion of the image forming light flux having reached the image plane is missing, which tends to allow ring-like blurring to occur readily at the object image due to defocusing (focusing position offset) manifesting relative to the image plane.

According to the 1st aspect of the present invention, a catadioptric imaging lens, comprises: a first reflecting mirror, a second reflecting mirror and a lens group, with the first reflecting mirror disposed closest to an object side where an object is present, the second reflecting mirror disposed second closest to the object and the lens group disposed furthest away from the object in a positional arrangement whereby light reflected at the first reflecting mirror is reflected at the second reflecting mirror and then travels through the lens group to form an object image at a predetermined image plane; wherein when a straight line connecting a center of the object and a center of the first reflecting mirror is designated as a first reference axis, a straight line connecting a center of the second reflecting mirror and a center of the image plane is designated as a second reference axis, a plane that contains the first reference axis and the second reference axis is designated as a reference plane, a plane that ranges through the center of the first reflecting mirror, is perpendicular to the reference plane and forms a predetermined angle with the first reference axis is designated as a first orthogonal plane, a plane that ranges through the center of the second reflecting mirror, is perpendicular to the reference plane and forms a predetermined angle with the second reference axis is designated as a second orthogonal plane, and a plane that ranges through a center of a surface in the lens group located closest to the second reflecting mirror, is perpendicular to the reference plane and is parallel to the second reference axis is designated as a third orthogonal plane: the first reflecting mirror and the second reflecting mirror are decentered within the reference plane; a reflecting surface of the first reflecting mirror is a rotationally asymmetrical aspherical surface, having a contour that manifests concavity on the object side within the reference plane and also within the first orthogonal plane; a reflecting surface of the second reflecting mirror is a rotationally asymmetrical aspherical surface, having a contour that manifests convexity on a side further toward the first reflecting mirror within the reference plane and also within the second orthogonal plane; and the surface in the lens group located closest to the second reflecting mirror is a rotationally asymmetrical aspherical surface, having a contour that manifests concavity on a side further toward the second reflecting mirror within the reference plane and manifests convexity on the side further toward the second reflecting mirror within the third orthogonal plane.

According to the 2nd aspect of the present invention, in the catadioptric imaging lens according to the 1st aspect, a curvature of the reflecting surface of the first reflecting mirror on the first reference axis within the reference plane may be greater than a curvature within the first orthogonal plane.

According to the 3rd aspect of the present invention, in the catadioptric imaging lens according to the 1st or 2nd aspects, a curvature of the reflecting surface of the second reflecting mirror on the second reference axis within the reference plane may be smaller than a curvature within the second orthogonal plane.

According to the 4th aspect of the present invention, in the catadioptric imaging lens according to any one of the 1st through 3rd aspects, the first reference axis and the second reference axis may be parallel to each other.

According to the 5th aspect of the present invention, in the catadioptric imaging lens according to any one of the 1st through 4th aspects, the lens group may include three lenses each comprising an entry surface and an exit surface that are rotationally asymmetrical aspherical surfaces.

According to the 6th aspect of the present invention, it is preferred that in the catadioptric imaging lens according to any one of the 1st through 5th aspects, each aspherical surface among the rotationally asymmetrical aspherical surfaces is defined as expressed in (1) below, when a direction along which a normal line extends at an origin point of a tangent plane to the aspherical surface is designated as a z direction, two directions extending orthogonally to each other within the tangent plane are designated as an x direction and a y direction, s represents a sag quantity indicating an extent of sagging of the aspherical surface manifesting along the z direction, c represents a curvature at the origin point, r represents a distance from the origin point, k represents a conic constant, m and n each represent an integer equal to or greater than 0, and C(m, n) represents a coefficient for a monomial $x^m \cdot y^n$, $$s = \frac{cr^2}{1 + \sqrt{1-(1+k)c^2 r^2}} + \sum_m \cdot \sum_n \{C(m,n) \cdot x^m \cdot y^n\} \quad (1)$$

According to the 7th aspect of the present invention, in the catadioptric imaging lens according to the 6th aspect, α1 representing a sum of the coefficient C(2, 0) of $x^2$ and a value c/2 that is half the curvature c, and β1 representing a sum of the coefficient C(0, 2) of $y^2$ and a value c/2 that is half the curvature c in relation to expression (1) defining the aspherical reflecting surface of the first reflecting mirror, may satisfy a condition expressed as; $0.500<\beta1/\alpha1<1.000$.

According to the 8th aspect of the present invention, in the catadioptric imaging lens according to the 6th or 7th aspects, $\alpha2$ representing a sum of the coefficient C(2, 0) of $x^2$ and a value c/2 that is half the curvature c, and $\beta2$ representing a sum of the coefficient C(0, 2) of $y^2$ and the value c/2 that is half the curvature c in relation to expression (1) defining the aspherical reflecting surface of the second reflecting mirror, may satisfy a condition expressed as; $0.100<\beta2/\alpha2<1.000$.

According to the 9th aspect of the present invention, in the catadioptric imaging lens according to any one of the 6th through 8th aspects, $\alpha3$ representing a sum of the coefficient C(2, 0) of $x^2$ and a value c/2 that is half the curvature c, and $\beta3$ representing a sum of the coefficient C(0, 2) of $y^2$ and the value c/2 that is half the curvature c in relation to expression (1) defining an aspherical entry surface of the lens located closest to the second reflecting mirror among the lenses in the lens group, may satisfy a condition expressed as; $-4.000<\beta3/\alpha3<-1.000$.

According to the 10th aspect of the present invention, the catadioptric imaging lens according to any one of the 1st through 9th aspect may further comprise a diffractive optical element disposed on the object side relative to the first reflecting mirror, which includes a rotationally asymmetrical aspherical diffractive optical surface.

According to the 11th aspect of the present invention, it is preferred that in the catadioptric imaging lens according to the 10th aspect, when a direction along which the first reference axis extends is designated as a z direction, two directions extending orthogonally to each other within a plane perpendicular to the z direction are designated as an x direction and a y direction, $\phi$ represents a phase shape at the diffractive optical surface, $\lambda_0$ ($\lambda_0=546$ (nm)) represents a reference wavelength, m (m=1) represents an order of diffraction, i and j are integers equal to or greater than 0, and D(i, j) represents a coefficient of a monomial $x^i \cdot y^j$, the aspherical surface at the diffractive optical surface is defined as expressed in (2) below;

$$\phi = \frac{2\pi}{m\lambda_0} \sum_i \cdot \sum_j \{D(i, j) \cdot x^i \cdot y^j\}; \qquad (2)$$

and $\alpha4$ representing the coefficient D(2, 0) of $x^2$, and $\beta4$ representing the coefficient D(0, 2) of $y^2$, satisfy a condition expressed as; $-7.000<\beta4/\alpha4<-1.000$.

At the catadioptric imaging lens according to the present invention, an object image is formed with a light flux achieving a solid cross-section without any missing portion in the central area thereof, and thus, a sharp object image is obtained without any of the ring-like blurring that tends to occur at conventional catadioptric imaging lenses due to defocusing.

BRIEF DESCRIPTION OF THE DRAWINGS

FIG. 2A is a perspective schematically illustrating the characteristics of the reflecting surface of the concave reflecting mirror, FIG. 2B is a perspective schematically illustrating the characteristics of the reflecting surface of the convex reflecting mirror, and FIG. 2C is a perspective schematically illustrating the characteristics of the entry surface of the lens L1.

DESCRIPTION OF PREFERRED EMBODIMENTS

Figure 1:
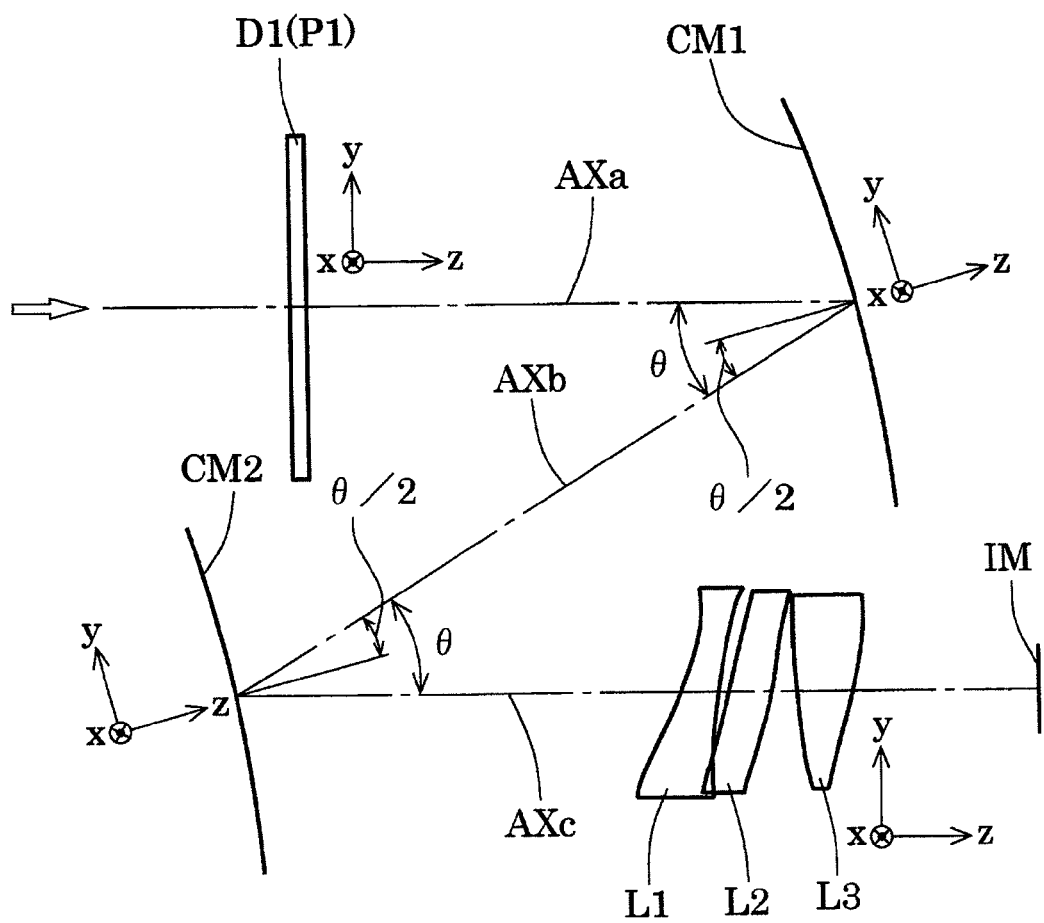
FIG. 1 is a schematic illustration showing the basic structure of the catadioptric imaging lens pertaining to various particular examples of the embodiment.
Figure 1:
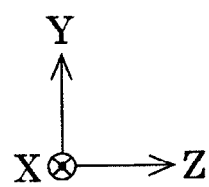

The following is a description of the embodiments, given in reference to the attached drawings. FIG. 1 schematically illustrates the basic structure adopted in the catadioptric imaging lenses achieved in various particular embodiments of the present invention. The catadioptric imaging lenses achieved in the various embodiments, which may be photographic lenses used in, for instance, cameras, each include a concave reflecting mirror (first reflecting mirror) CM1, a convex reflecting mirror (second reflecting mirror) CM2 and a lens group made up with three lenses L1, L2 and L3, listed here in the order in which light, traveling from the object side, enters therein, as shown in FIG. 1. A diffractive optical element D1 is disposed on the object side relative to the concave reflecting mirror CM1 in first through third embodiments, whereas a plane parallel plate P1 is disposed on the object side relative to the concave reflecting mirror CM1 in a fourth embodiment.

A reference axis (first reference axis) AXa in FIG. 1 forms a straight line connecting the center of an object present at infinity and the center of the concave reflecting mirror CM1 (the origin point of its reflecting surface). A reference axis AXb forms a straight line connecting the center of the concave reflecting mirror CM1 and the center of the convex reflecting mirror CM2 (the origin point of its reflecting surface). A reference axis (second reference axis) is a straight line connecting the center of the convex reflecting mirror CM2 and an image plane IM. FIG. 1 shows a global coordinate system (XYZ) with the X axis set along the direction running perpendicular to the drawing sheet on which FIG. 1 is presented, the Y axis set along the vertical direction along the drawing sheet and the Z axis set along the horizontal direction along the drawing sheet.

The reference axes Axa, Axb and Axc each extend in a straight line along the drawing sheet (the YZ plane) on which FIG. 1 is presented. Namely, the reference axes AXa through AXc, which form a zigzag pattern in a sectional view taken along the YZ plane, are aligned and appear to be a single straight line in a sectional view taken along the XZ plane. The reference axis AXa and the reference axis AXc extend parallel to each other along the Z direction. A predetermined angle θ (32°) in each particular embodiment) is formed by the reference axes Axa and Axb and also by the reference axes AXc and AXb. The following description will be given by designating the plane that contains the reference axis AXa and the reference axis AXc, i.e., the YZ plane, as a reference plane.

In FIG. 1, local coordinate systems (x, y, z) are individually set at the diffractive optical element D1 (or the plane parallel plate P1), the concave reflecting mirror CM1, the convex reflecting mirror CM2 and the lens group made up with lenses L1 through L3. The x axes, the y axes and the z axes in the local coordinates systems corresponding to the diffractive optical element D1 (or the plane parallel plate P1) and the lens group L 1 through L3 are set respectively parallel to the X axis, the Y axis and the Z axis in the global coordinate system. In the local coordinate systems for the concave reflecting mirror CM1 and the convex reflecting mirror CM2, the x axes are set parallel to the X axis, the z axes are set so as to extend along a direction that forms an angle θ/2 with the Z axis on the drawing sheet on which FIG. 1 is presented and the y axes are set orthogonally to the z axes on the drawing sheet on which FIG. 1 is presented.

The reflecting surface of the concave reflecting mirror CM1 is a rotationally asymmetrical aspherical surface, which assumes a contour with concavity manifesting on the object side within the reference plane and also within an xz plane (first orthogonal plane) ranging perpendicular to the reference plane, as FIG. 2A indicates. The curvature of the reflecting surface of the concave reflecting mirror CM1, within the reference plane on the reference axis AXa (i.e., on the origin point), is greater than the curvature within the xz plane perpendicular to the reference plane. The reflecting surface of the convex reflecting mirror CM2 is a rotationally asymmetrical aspherical surface, which assumes a contour with convexity manifesting on the side where the concave reflecting mirror CM1 is present within the reference plane and also within an xz plane (second orthogonal plane) ranging perpendicular to the reference plane, as FIG. 2B indicates. The curvature of the reflecting surface of the convex reflecting mirror CM2, within the reference plane on the reference axis AXc (i.e., on the origin point), is less than the curvature within the xz plane perpendicular to the reference plane.

The surface in the lens group L1 through L3, which is present closest to the convex reflecting mirror CM2, i.e., the entry surface of the lens L1, is a rotationally asymmetrical aspherical surface. This surface manifests concavity on the side toward the convex reflecting mirror CM2 within the reference surface and manifests convexity on the side toward the convex reflecting mirror CM2 within an xz plane (third orthogonal plane) perpendicular to the reference plane, as FIG. 2C indicates. The other surfaces in the lens group L1 through L3, i.e., the exit surface of the lens L1, the entry surface and the exit surface of the lens L2 and the entry surface and the exit surface of the lens L3, are all rotationally asymmetrical aspherical surfaces as well. The diffractive optical element D1 disposed on the object side relative to the concave reflecting mirror CM1 has a rotationally asymmetrical aspherical diffractive optical surface.

The concave reflecting mirror CM1 and the convex reflecting mirror CM2 described above are decentered within the reference plane so that light, having been reflected at the concave reflecting mirror CM1 and then reflected at the convex reflecting mirror CM2, travels through the lens group L1 through L3 and forms an object image on the image plane IM. In other words, the concave reflecting mirror CM1 and the convex reflecting mirror CM2 are disposed in an eccentric arrangement so as to allow the central portion of a light flux, traveling from the object, to reach the image plane IM without being blocked and ultimately to allow the light flux with a solid cross-section without any central portion thereof missing to form an object image on the image plane IM. The catadioptric imaging lenses achieved in the various particular embodiments structured as described above thus assure both good correction of chromatic aberration and system miniaturization and, furthermore, are capable of forming an object image with an intact light flux having a solid cross-section without any central portion thereof missing. Such an object image achieves a natural appearance free of any ring-like blurring that would otherwise be caused by defocusing.

The rotationally asymmetrical aspherical surfaces (i.e., free-form surfaces) at the concave reflecting mirror CM1, the convex reflecting mirror CM2 and the lens group L1 through L3 are all defined as expressed in (3) below. s, c, r, k, m and n, and C(m, n) in expression (3) respectively represent the extent of sag (sag quantity expressed in units of mm) manifested by the particular aspherical surface along the z direction, the curvature (the reciprocal of the radius of curvature, expressed in units of $mm^{-1}$) at the origin point, the distance from the origin point (the value representing the square root of $x^2+y^2$, expressed in units of mm), a conic constant, integers equal to or greater than 0 and a coefficient of a monomial $x^m \cdot y^n$.

$$s = \frac{cr^2}{1 + \sqrt{1 - (1+k)c^2 r^2}} + \sum_m \cdot \sum_n \{C(m, n) \cdot x^m \cdot y^n\} \quad (3)$$

Good correction of astigmatism can be achieved by ensuring that the following conditional expression (A) is true when α1 represents the sum of the coefficient C(2, 0) of $x^2$ and the value c/2, which is half of the curvature c, and β1 represents the sum of the coefficient C(0, 2) of $y^2$ and the value c/2, which is half the curvature c, in expression (1) defining the aspherical reflecting surface of the concave reflecting mirror CM1.

$$0.500 < \beta1/\alpha1 < 1.000 \quad (A)$$

If β1/α1 exceeds the upper limit or is less than the lower limit defined in conditional expression (A), significant astigmatism is bound to manifest. It is to be noted that the upper limit may be instead set to 0.975 so as to enhance the effect achieved by satisfying conditional expression (A). As a further alternative, the upper limit may be set to an even lower value of 0.950. Moreover, the lower limit may be instead set to 0.655 so as to enhance the effect achieved by satisfying conditional expression (A). As a further alternative, the lower limit may be set to an even higher value of 0.810. It is to be noted that $|\beta 1|$ may be smaller than $|\alpha 1|$.

When a lens is decentered, a greater extent of astigmatism occurs under normal circumstances. In this embodiment, good astigmatism correction is assured by the aspherical reflecting surface of the concave reflecting mirror CM1, designated as the first reflecting mirror to take on an astigmatic component. The term "astigmatic component" in this context refers to a component that corresponds to the difference between the radius of curvature along the x direction and the radius of curvature along the y direction. Since the reflecting surface of the concave reflecting mirror CM1 is located at a position close to the aperture, light fluxes traveling from various angles of view enter the reflecting surface at substantially the same position. For this reason, allowing the aspherical reflecting surface of the concave reflecting mirror CM1 to take on an astigmatic component will provide matching effects to the light fluxes traveling from the various angles of view and thus will achieve effective correction of aberration.

Good correction of astigmatism can be achieved by ensuring that the following conditional expression (B) is true when $\alpha 2$ represents the sum of the coefficient C(2, 0) of $x^2$ and the value c/2, which is half of the curvature c, and $\beta 2$ represents the sum of the coefficient C(0, 2) of $y^2$ and the value c/2, which is half the curvature c in expression (1) defining the aspherical reflecting surface of the convex reflecting mirror CM2.

$$0.100 < \beta 2/\alpha 2 < 1.000 \qquad (B)$$

If $\beta 2/\alpha 2$ exceeds the upper limit or is less than the lower limit defined in conditional expression (B), significant astigmatism is bound to manifest. It is to be noted that the upper limit may be instead set to 0.640 so as to enhance the effect achieved by satisfying conditional expression (B). As a further alternative, the upper limit may be set to an even lower value of 0.290. Moreover, the lower limit may be instead set to 0.150 so as to enhance the effect achieved by satisfying conditional expression (B). As a further alternative, the lower limit may be set to an even higher value of 0.200. It is to be noted that $|\beta 2|$ may be smaller than $|\alpha 2|$.

Even better astigmatism correction can be achieved by rendering the aspherical reflecting surface of the convex reflecting mirror CM2, designated as the second reflecting mirror as well as rendering the concave reflecting mirror CM1 to take on an astigmatic component. While light fluxes traveling from various angles of view enter the concave reflecting mirror CM1 at substantially the same position, the light fluxes enter the reflecting surface of the concave reflecting mirror CM1 with various angles of incidence. This means that, strictly speaking, the effect achieved by taking on the astigmatic component at the concave reflecting mirror CM1 changes from one angle of view to another. Accordingly, even more effective and uniform aberration correction can be achieved for all the angles of view by rendering the reflecting surface of the convex reflecting mirror CM2, set apart over a greater distance from the aperture than the concave reflecting mirror CM1, where light fluxes traveling on various angles of view enter at different positions, to take on the astigmatic component, as well.

Good correction of astigmatism can be achieved by ensuring that the following conditional expression (C) is true when $\alpha 3$ represents the sum of the coefficient C(2, 0) of $x^2$ and the value c/2, which is half of the curvature c, and $\beta 3$ represents the sum of the coefficient C(0, 2) of $y^2$ and the value c/2, which is half the curvature c, in expression (1) defining the surface located closest to the object in the lens group made up with the lenses L1 through L3, i.e., the aspherical entry surface of the lens L1.

$$-4.000 < \beta 3/\alpha 3 < -1.000 \qquad (C)$$

If $\beta 3/\alpha 3$ exceeds the upper limit or is less than the lower limit defined in conditional expression (C), significant astigmatism is bound to manifest. It is to be noted that the upper limit may be instead set to −1.100 so as to enhance the effect achieved by satisfying conditional expression (C). As a further alternative, the upper limit may be set to an even lower value of −1.200. Moreover, the lower limit may be instead set to −3.500 so as to enhance the effect achieved by satisfying conditional expression (C). As a further alternative, the lower limit may be set to an even higher value of −3.000.

At the entry surface of the lens L1, which is further set apart from the aperture than the convex reflecting mirror CM2, light fluxes traveling on various angles of view enter at different entry positions. Thus, effective astigmatism correction can be assured by rendering the aspherical entry surface of the lens L1 to take on the astigmatic component as well as rendering the concave reflecting mirror CM1 and the convex reflecting mirror CM2 to take on the astigmatic component. However, an astigmatic component at a surface closer to the image plane IM, e.g., a surface of the lens L3, would be a factor affecting distortion rather than astigmatism and might, therefore, prove to be problematic.

An aspherical surface (i.e., a free-form surface) at the diffractive optical surface of the diffractive optical element D1 is defined as expressed in (4) below. Expression (4) expresses the phase shape achieved at the diffractive surface of the diffractive element D1. $\phi$, $\lambda 0$, m, i and j and D(i, j) in expression (4) respectively represent the phase shape achieved at the diffractive optical surface, a reference wavelength ($\lambda 0$=546 mm), the order of diffraction (m=1 in each embodiment), integers equal to or greater than 0 and a coefficient of a monomial $x^i \cdot y^j$.

$$\phi = \frac{2\pi}{m\lambda_0} \sum_i \cdot \sum_j \{D(i, j) \cdot x^i \cdot y^j\} \qquad (4)$$

Good correction of astigmatism can be achieved by ensuring that the following conditional expression (D) is true when $\alpha 4$ represents the coefficient D(2, 0) of $x^2$ and $\beta 4$ represents the coefficient D(0, 2) of $y^2$ in expression (4) defining the aspherical diffractive optical surface of the diffractive optical element D1.

$$-7.000 < \beta 4/\alpha 4 < -1.000 \qquad (D)$$

If $\beta 4/\alpha 4$ exceeds the upper limit or is less than the lower limit defined in conditional expression (D), significant astigmatism is bound to manifest. It is to be noted that the upper limit may be instead set to −1.595 so as to enhance the effect achieved by satisfying conditional expression (D). As a further alternative, the upper limit may be set to an even lower value of −2.180. Moreover, the lower limit may be instead set to −6.140 so as to enhance the effect achieved by satisfying conditional expression (D). As a further alternative, the lower limit may be set to an even higher value of −5.300.

First Example

Figure 3:
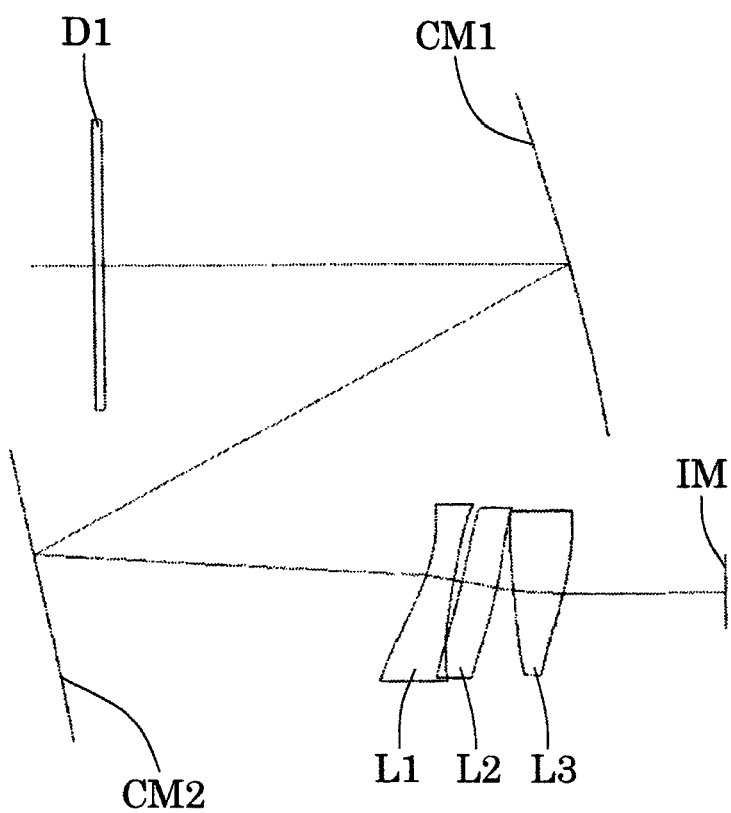
FIG. 3 is a schematic illustration showing the structure of the catadioptric imaging lens achieved in a first example in a sectional view taken along the YZ plane.
Figure 3:
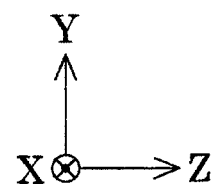
Figure 4:
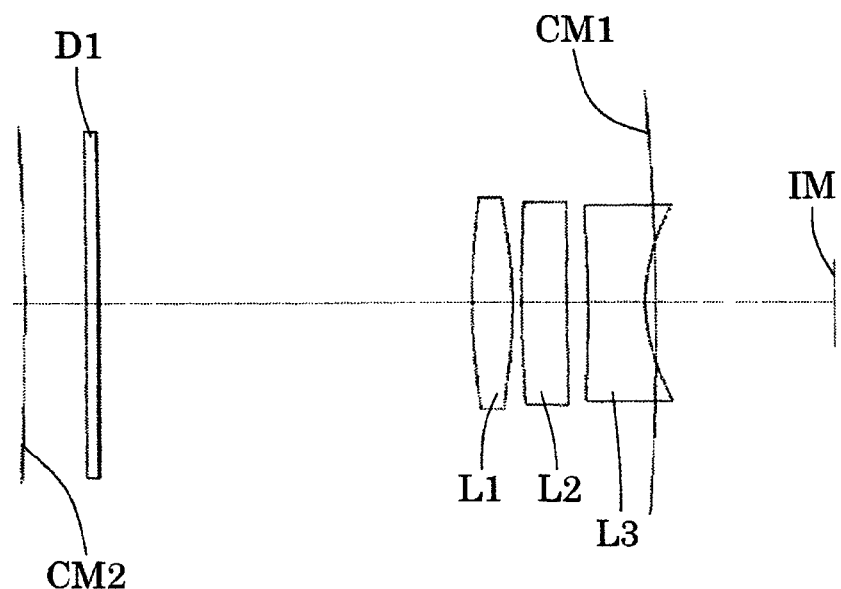
FIG. 4 is a schematic illustration showing the structure of the catadioptric imaging lens achieved in the first example in a sectional view taken along the XZ plane.
Figure 4:
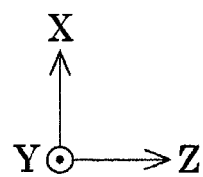

FIG. 3 is a schematic illustration showing the structure of the catadioptric imaging lens achieved in the first example in a sectional view taken along the YZ plane. FIG. 4 is a schematic illustration showing the structure of the catadioptric imaging lens achieved in the first example in a sectional view taken along the XZ plane. The values representing various technical factors pertaining to the catadioptric imaging lens achieved in the first example are listed in the following Table (1).

In the section pertaining to the glass material data in Table (1), "ne" represents the refractive index of each optical material (glass material) for e-line (with a reference wavelength of 546.07 nm) and "νe" represents Abbe's number calculated in reference to the e-line. In the section pertaining to the optical member data in Table (1), the various surface numbers indicate the order with which the individual surfaces are set, starting on the object side, along the path through which light advances from the object present at infinity toward the image plane IM, and a given interval indicates the interval (mm) between surfaces measured along the corresponding reference axis AXa, AXb or AXc. It is to be noted that the first surface is the entry surface of the diffractive optical element D1, that the third surface is the diffractive optical surface of the diffractive optical element D1 and that the fourth surface is the exit surface of the diffractive optical element D1. In addition, the fifth surface is the reflecting surface of the concave reflecting surface CM1 and the sixth surface is the reflecting surface of the convex reflecting mirror CM2. The seventh through the twelfth surfaces respectively correspond to the entry surface and the exit surface of the lens L1, the exit surface of the lens L1, the entry surface and the exit surface of the lens L2, and the entry surface and the exit surface of the lens L3.

Figure 5:
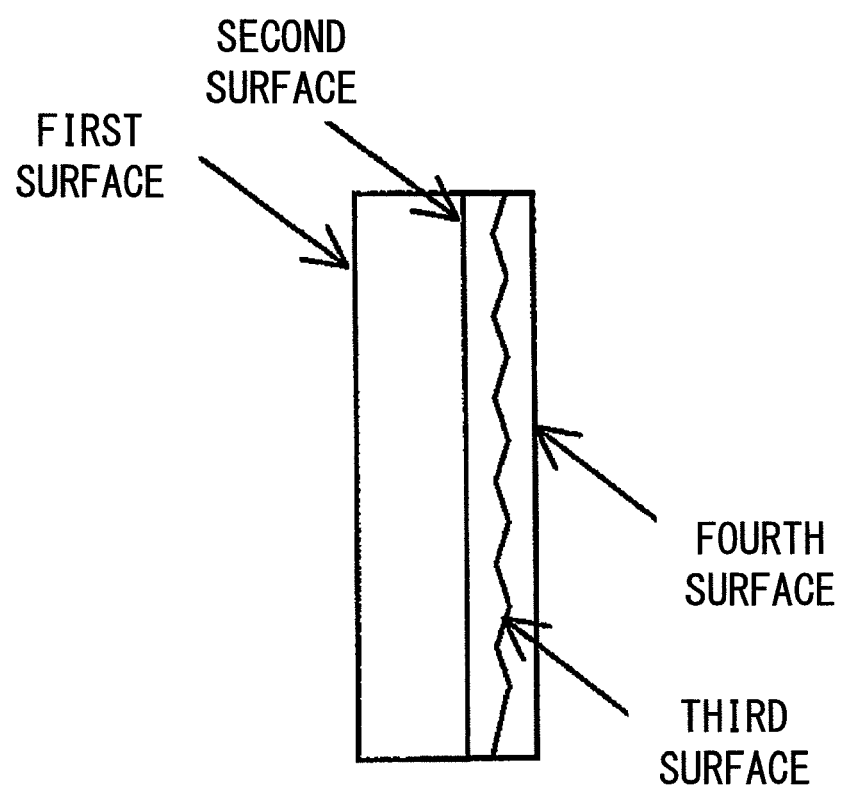
FIG. 5 shows the relationship between various layers in the diffractive optical element and the corresponding surface numbers.

While the diffractive optical element D1 achieved in each example assumes a structure that includes first through fourth surfaces as shown in FIG. 5, such a diffractive element is a so-called bonded laminate-type diffractive element, which may be manufactured by forming two layers with different refractive indices, each assuming a 10 μm thickness, on a glass substrate that includes a first surface and a second surface and by forming a diffractive surface at a third surface located between the first layer and the second layer. However, it will be obvious that the present invention may be adopted equally effectively in conjunction with another type of diffractive element as long as a matching phase is achieved.

In the section for aspherical surface data 1 in Table (1), various parameters in expression (3) defining the rotationally asymmetrical aspherical surfaces (free-form surfaces) in the concave reflecting mirror CM1, the convex reflecting mirror CM2 and the lens group L1 through L3 are indicated. In the section pertaining to aspherical surface data 2 in Table (1), various parameters in expression (4) defining the aspherical surface (free-form surface) at the diffractive optical surface of the diffractive optical element D1 are indicated. It is to be noted that subsequent tables (2) through (4) adopt a notational convention similar to that in Table (1). In addition, the specifications entered in the glass material data section in Table (1) also apply to the subsequent examples and accordingly, tables (2) through (4) do not include the same data.

TABLE 1

(glass material data)

|  | ne | νe |
| --- | --- | --- |
| glass material 1 | 1.51872 | 63.9 |
| glass material 2 | 1.53150 | 33.5 |
| glass material 3 | 1.55980 | 48.7 |
| glass material 4 | 1.53340 | 55.3 |
| glass material 5 | 1.61260 | 26.7 |

(optical member data)

| surface number | surface type | interval | glass material type |
| --- | --- | --- | --- |
| 1 | flat surface (aperture) | 3 | glass material 1 |
| 2 | flat surface | 0.01 | glass material 2 |
| 3 | diffractive surface | 0.01 | glass material 3 |
| 4 | flat surface | 150 |  |
| 5 | free-form surface | −200.412002 | reflective |
| 6 | free-form surface | 120.1449553 | reflective |
| 7 | free-form surface | 10.72678395 | glass material 4 |
| 8 | free-form surface | 2.42331283 |  |
| 9 | free-form surface | 12 | glass material 5 |
| 10 | free-form surface | 6 |  |
| 11 | free-form surface | 15.62983966 | glass material 4 |
| 12 | free-form surface | 51.41243861 |  |
| image plane |  |  |  |

(aspherical surface data 1)

| | surface number | | | |
| --- | --- | --- | --- | --- |
| | 5 | 6 | 7 | 8 |
| | 9 | 10 | 11 | 12 |
| c | −0.001486305 | −0.001206417 | 0 | 0 |
| | 0 | 0 | 0 | 0 |
| k | 0 | 0 | 0 | 0 |
| | 0 | 0 | 0 | 0 |
| C(1,0) | 0 | 0 | 0 | 0 |
| | 0 | 0 | 0 | 0 |
| C(0,1) | 0.032112682 | 0.063048375 | 0.434590318 | 0.170459639 |
| | 0.251690112 | 0.225332023 | −0.084485502 | 0.238064874 |

TABLE 1-continued

| | | | | |
|---|---|---|---|---|
| C(2,0) | 3.94E−05 | 9.19E−05 | 0.003169148 | −0.003708737 |
| | 0.002062952 | 0.001571848 | −0.001367424 | 0.011228754 |
| C(1,1) | 0 | 0 | 0 | 0 |
| | 0 | 0 | 0 | 0 |
| C(0,2) | 9.49E−05 | 0.000466778 | −0.004711029 | 0.000985123 |
| | −0.002015254 | −0.003613952 | −0.000192662 | −0.00317807 |
| C(3,0) | 0 | 0 | 0 | 0 |
| | 0 | 0 | 0 | 0 |
| C(2,1) | 8.82E−07 | 9.36E−06 | 4.98E−06 | 9.58E−05 |
| | −0.000183094 | −0.000258534 | −0.000308758 | −0.000364511 |
| C(1,2) | 0 | 0 | 0 | 0 |
| | 0 | 0 | 0 | 0 |
| C(0,3) | 5.55E−07 | 3.04E−06 | −0.000159792 | −5.32E−05 |
| | 1.74E−05 | 2.70E−05 | 2.72E−05 | −6.12E−05 |
| C(4,0) | 1.47E−09 | 2.95E−08 | −8.41E−07 | 4.23E−07 |
| | −1.21E−06 | −1.27E−06 | 2.23E−07 | −1.44E−06 |
| C(3,1) | 0 | 0 | 0 | 0 |
| | 0 | 0 | 0 | 0 |
| C(2,2) | 1.25E−09 | −2.19E−08 | 8.88E−07 | −3.80E−06 |
| | −2.04E−07 | 1.93E−06 | −9.13E−06 | −5.91E−06 |
| C(1,3) | 0 | 0 | 0 | 0 |
| | 0 | 0 | 0 | 0 |
| C(0,4) | 8.80E−10 | 3.54E−09 | −2.05E−07 | 2.74E−06 |
| | 1.64E−06 | 2.07E−06 | 2.38E−06 | −2.18E−07 |
| C(5,0) | 0 | 0 | 0 | 0 |
| | 0 | 0 | 0 | 0 |
| C(4,1) | 7.07E−12 | −3.38E−10 | 3.34E−08 | 2.80E−08 |
| | 8.79E−08 | 1.19E−07 | 1.66E−08 | −2.83E−08 |
| C(3,2) | 0 | 0 | 0 | 0 |
| | 0 | 0 | 0 | 0 |
| C(2,3) | 4.65E−12 | −9.99E−11 | −7.42E−09 | −7.00E−08 |
| | 5.13E−08 | 1.06E−07 | 1.25E−07 | 1.67E−07 |
| C(1,4) | 0 | 0 | 0 | 0 |
| | 0 | 0 | 0 | 0 |
| C(0,5) | 2.78E−12 | 4.10E−11 | 2.83E−08 | 3.66E−08 |
| | 2.41E−09 | 4.62E−09 | −3.17E−08 | −2.56E−08 |
| C(6,0) | 1.28E−14 | −8.15E−14 | 3.27E−10 | 5.48E−10 |
| | 3.49E−11 | −4.55E−10 | 3.40E−10 | 1.34E−09 |
| C(5,1) | 0 | 0 | 0 | 0 |
| | 0 | 0 | 0 | 0 |
| C(4,2) | 9.43E−14 | 3.79E−12 | 6.12E−10 | 2.50E−09 |
| | 1.91E−09 | −5.93E−10 | 4.31E−09 | 4.98E−09 |
| C(3,3) | 0 | 0 | 0 | 0 |
| | 0 | 0 | 0 | 0 |
| C(2,4) | 6.20E−14 | 2.14E−12 | −2.56E−09 | 6.15E−10 |
| | 5.16E−09 | 2.43E−09 | −4.53E−09 | −3.95E−09 |
| C(1,5) | 0 | 0 | 0 | 0 |
| | 0 | 0 | 0 | 0 |
| C(0,6) | −3.09E−14 | −9.14E−13 | 7.02E−10 | 3.86E−10 |
| | 6.01E−10 | 4.76E−10 | 4.83E−10 | 9.73E−10 |

(aspherical surface data 2)

| | |
|---|---|
| diffractive optical element third surface | three surfaces |
| order of diffraction | 1 |
| normalized wavelength | 546.074 |
| D(1,0) | 0.000E+00 |
| D(0,1) | 4.869E−05 |
| D(2,0) | −1.176E−06 |
| D(1,1) | 0.000E+00 |
| D(0,2) | 4.369E−06 |
| D(3,0) | 0.000E+00 |
| D(2,1) | 3.667E−08 |
| D(1,2) | 0.000E+00 |
| D(0,3) | 1.064E−08 |
| D(4,0) | 1.278E−10 |
| D(3,1) | 0.000E+00 |
| D(2,2) | 2.980E−10 |
| D(1,3) | 0.000E+00 |
| D(0,4) | −1.339E−10 |
| D(5,0) | 0.000E+00 |
| D(4,1) | −8.887E−12 |
| D(3,2) | 0.000E+00 |
| D(2,3) | −2.761E−12 |
| D(1,4) | 0.000E+00 |
| D(0,5) | −2.859E−12 |
| D(6,0) | 8.795E−15 |
| D(5,1) | 0.000E+00 |
| D(4,2) | −1.090E−13 |
| D(3,3) | 0.000E+00 |

TABLE 1-continued

| | |
|---|---|
| D(2,4) | −5.885E−14 |
| D(1,5) | 0.000E+00 |
| D(0,6) | 2.375E−14 |
| D(7,0) | 0.000E+00 |
| D(6,1) | 3.775E−16 |
| D(5,2) | 0.000E+00 |
| D(4,3) | 2.051E−15 |
| D(3,4) | 0.000E+00 |
| D(2,5) | 1.588E−15 |
| D(1,6) | 0.000E+00 |
| D(0,7) | 7.094E−16 |
| D(8,0) | −1.073E−17 |
| D(7,1) | 0.000E+00 |
| D(6,2) | 5.738E−18 |
| D(5,3) | 0.000E+00 |
| D(4,4) | −1.170E−19 |
| D(3,5) | 0.000E+00 |
| D(2,6) | 8.592E−18 |
| D(1,7) | 0.000E+00 |
| D(0,8) | 2.501E−17 |
| D(9,0) | 0.000E+00 |
| D(8,1) | −4.793E−20 |
| D(7,2) | 0.000E+00 |
| D(6,3) | −1.755E−19 |
| D(5,4) | 0.000E+00 |
| D(4,5) | −6.697E−19 |
| D(3,6) | 0.000E+00 |
| D(2,7) | −2.635E−19 |
| D(1,8) | 0.000E+00 |
| D(0,9) | −1.707E−19 |
| D(10,0) | 2.511E−21 |
| D(9,1) | 0.000E+00 |
| D(8,2) | −5.984E−22 |
| D(7,3) | 0.000E+00 |
| D(6,4) | 2.847E−21 |
| D(5,5) | 0.000E+00 |
| D(4,6) | 6.794E−22 |
| D(3,7) | 0.000E+00 |
| D(2,8) | −4.232E−21 |
| D(1,9) | 0.000E+00 |
| D(0,10) | −5.733E−21 |

(corresponding values in conditional expressions)

| | |
|---|---|
| $\alpha 1 = C/2 + C(2,0) = -7.038 \times 10^{-4}$ | (fifth surface: coefficient of $x^2$) |
| $\beta 1 = C/2 + C(0,2) = -6.482 \times 10^{-4}$ | (fifth surface: coefficient of $y^2$) |
| $\alpha 2 = C/2 + C(2,0) = -5.113 \times 10^{-4}$ | (sixth surface: coefficient of $x^2$) |
| $\beta 2 = C/2 + C(0,2) = -1.364 \times 10^{-4}$ | (sixth surface: coefficient of $y^2$) |
| $\alpha 3 = C/2 + C(2,0) = 3.169 \times 10^{-3}$ | (seventh surface: coefficient of $x^2$) |
| $\beta 3 = C/2 + C(0,2) = -4.711 \times 10^{-3}$ | (seventh surface: coefficient of $y^2$) |
| $\alpha 4 = D(2,0) = -1.176 \times 10^{-6}$ | (third surface: coefficient of $x^2$) |
| $\beta 4 = D(0,2) = 4.369 \times 10^{-6}$ | (third surface: coefficient of $y^2$) |
| (A) $\beta 1/\alpha 1 = 0.9211$ | |
| (B) $\beta 2/\alpha 2 = 0.2668$ | |
| (C) $\beta 3/\alpha 3 = -1.487$ | |
| (D) $\beta 4/\alpha 4 = -3.715$ | |

Figure 6:
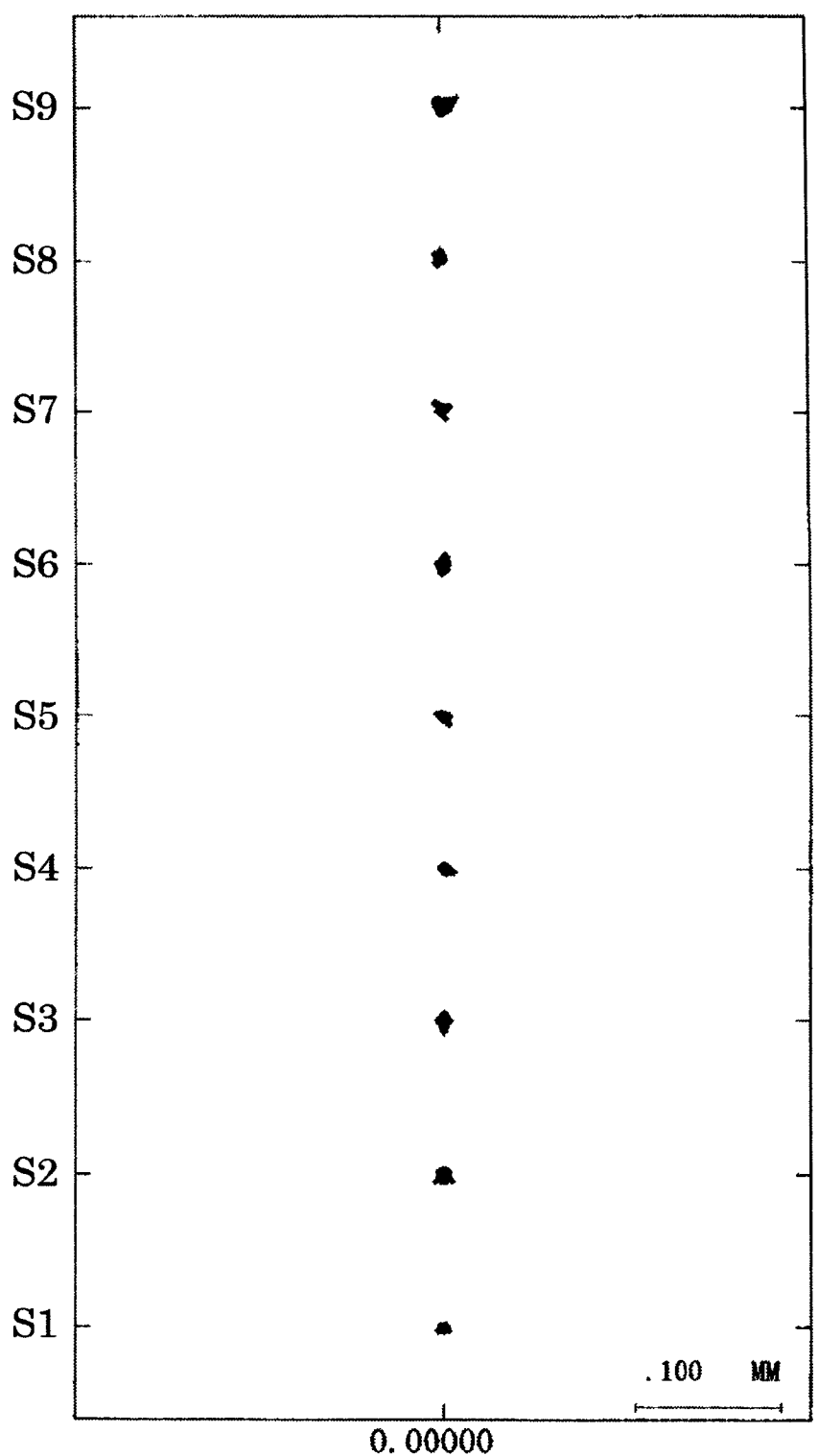
FIG. 6 presents a spot diagram indicating the aberration occurring in relation to the e-line in the first example.
Figure 7:
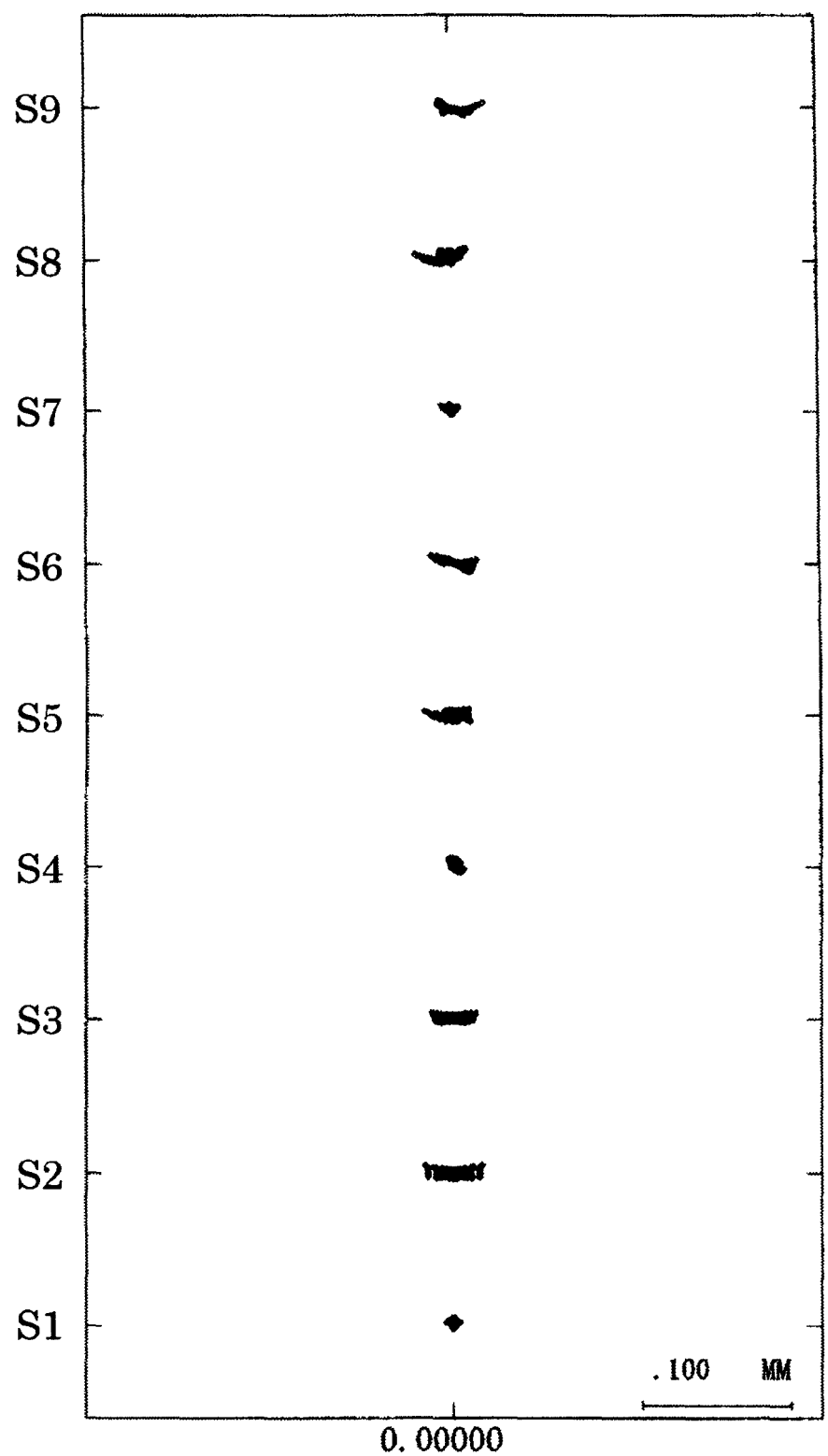
FIG. 7 presents a spot diagram indicating the aberration occurring in relation to the g-line in the first example.
Figure 8:
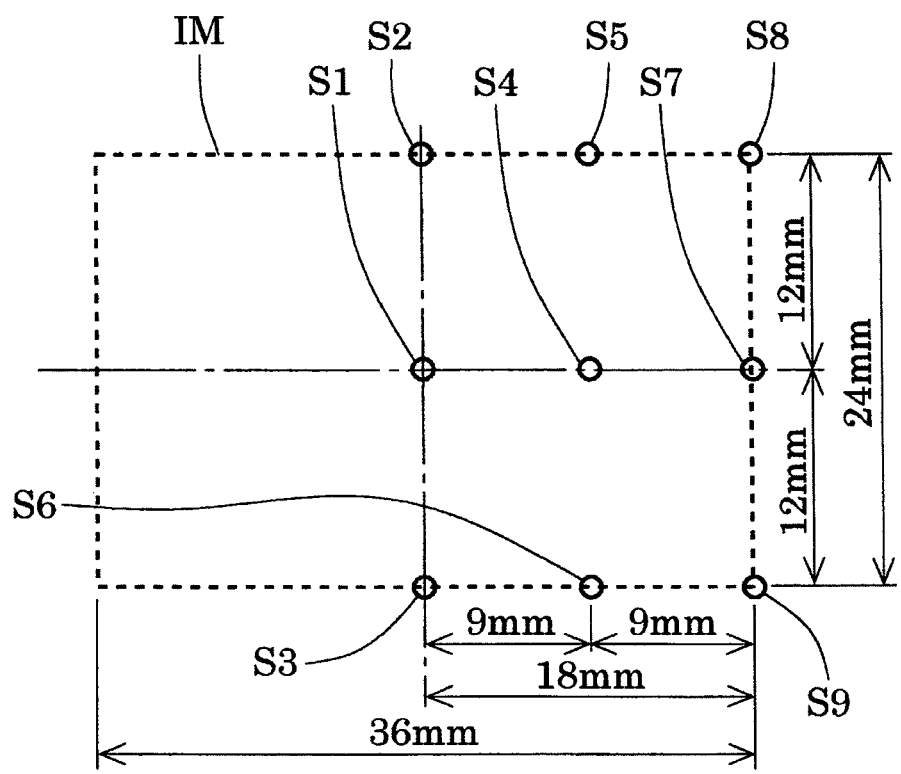
FIG. 8 indicates the positions of the nine image points in the spot diagrams pertaining to the various particular examples.

FIG. 6 presents a spot diagram indicating the aberration manifesting in relation to the e-line in the first example. FIG. 7 presents a spot diagram indicating the aberration manifesting in relation to the g-line (wavelength: 430.83 nm) in the first example. FIG. 8 indicates the positions of the nine image points assumed in the spot diagrams corresponding to the individual examples. While aberration is examined in relation to the wavelengths (the g-line, the F-line, the e-line, the d-line and the C-line) of five visible bright lines in the embodiment, the image forming performance of the optical system is described in reference to the spot diagrams provided in correspondence to two wavelengths, i.e., the e-line and the g-line.

The e-line wavelength is used as the reference wavelength in this embodiment, whereas the g-line has the shortest wavelength among the visible bright lines normally examined in relation to visible light optical systems. A greater extent of dispersion is observed in the refractive index of a glass material when the wavelength is shorter, and chromatic aberration occurs most readily on the g-line. In correspondence to the individual examples, spots at nine image points (viewpoints) S1 through S9 within a 36 mm×24 mm rectangular image plane IM at an FX format digital camera were calculated as indicated in FIG. 8. FIG. 8 assumes a unit scale length of 0.1 mm=100 vm.

FIG. 6 and FIG. 7 indicate that in the first example the sizes of the spots at the various image points S1 through S9, calculated for the e-line, are sufficiently small, demonstrating that uniform and robust correction of aberration is achieved over the entire image plane IM. Furthermore, the spots at the various image points S1 through S9 each take on a substantially symmetrical shape, demonstrating that asymmetrical aberration is effectively corrected. While the sizes of the spots calculated for the g-line are somewhat greater than the spot sizes corresponding to the e-line, chromatic aberration is still corrected better than that at a standard camera lens.

Second Example

Figure 9:
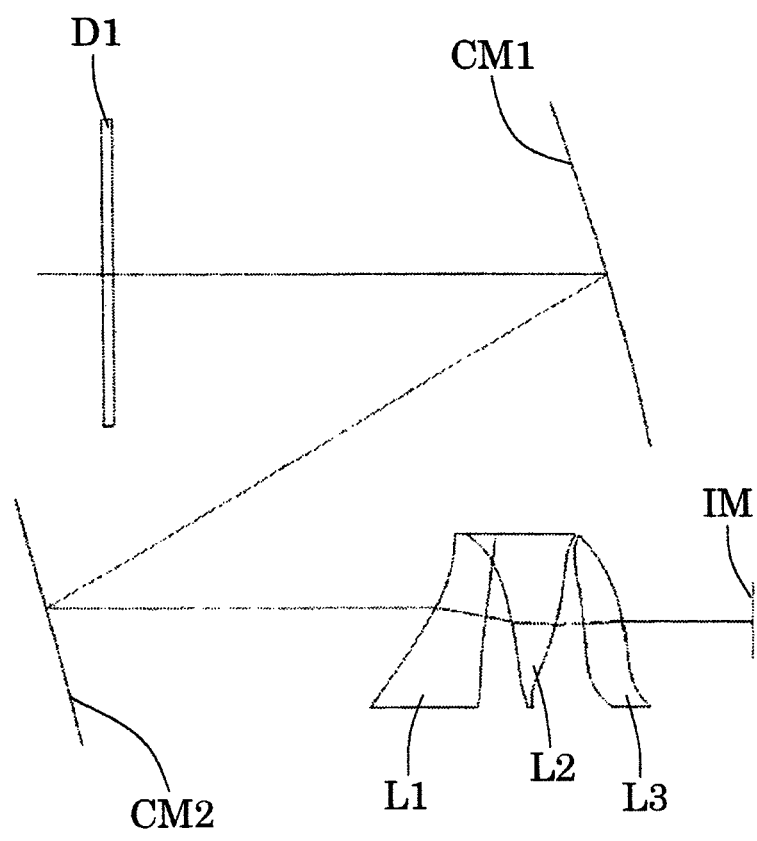
FIG. 9 is a schematic illustration showing the structure of the catadioptric imaging lens achieved in a second example in a sectional view taken along the YZ plane.
Figure 9:
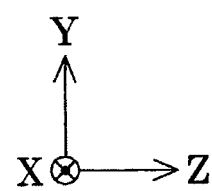
Figure 10:
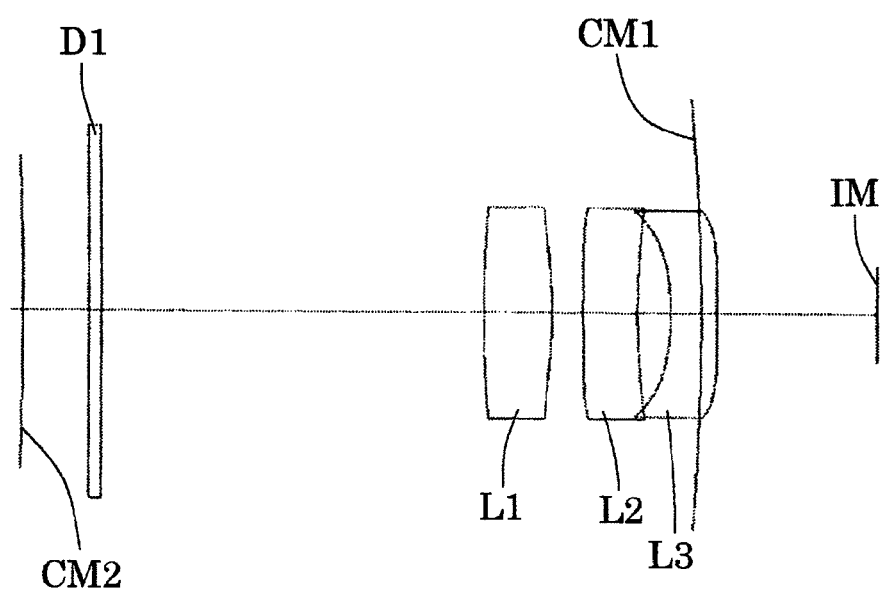
FIG. 10 is a schematic illustration showing the structure of the catadioptric imaging lens achieved in the second example in a sectional view taken along the XZ plane.
Figure 10:
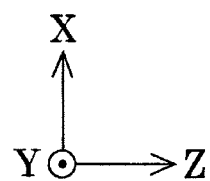

FIG. 9 is a schematic illustration showing the structure of the catadioptric imaging lens achieved in the second example in a sectional view taken along the YZ plane. FIG. 10 is a schematic illustration showing the structure of the catadioptric imaging lens achieved in the second example in a sectional view taken along the XZ plane. The values representing various technical factors pertaining to the catadioptric imaging lens achieved in the second example are listed in the following Table (2).

TABLE 2

(optical member data)

| surface number | surface type | interval | glass material type |
|---|---|---|---|
| 1 | flat surface (aperture) | 3 | glass material 1 |
| 2 | flat surface | 0.01 | glass material 2 |
| 3 | diffractive surface | 0.01 | glass material 3 |
| 4 | flat surface | 150 | |
| 5 | free-form surface | −200 | reflective |
| 6 | free-form surface | 115 | reflective |
| 7 | free-form surface | 17.24111086 | glass material 4 |
| 8 | free-form surface | 8 | |
| 9 | free-form surface | 13.55240699 | glass material 4 |
| 10 | free-form surface | 8.126118802 | |
| 11 | free-form surface | 11.67553616 | glass material 4 |
| 12 | free-form surface | 40 | |
| image plane | | | |

(aspherical surface data 1)

| | surface number | | | |
|---|---|---|---|---|
| | 5 / 9 | 6 / 10 | 7 / 11 | 8 / 12 |
| c | −0.00147492 / 0 | −0.001160776 / 0 | 0 / 0 | 0 / 0 |
| k | 0 / 0 | 0 / 0 | 0 / 0 | 0 / 0 |
| $C(1,0)$ | 0 / 0 | 0 / 0 | 0 / 0 | 0 / 0 |
| $C(0,1)$ | 0.01 / −0.196609212 | 0.01 / 0.24738848 | 0.585727752 / −0.093053052 | 0.119489101 / −0.171520867 |
| $C(2,0)$ | 6.59E−06 / 0.000961516 | 9.32E−05 / 0.003588166 | 0.002269171 / −0.007790008 | −0.0033056 / −0.000311932 |
| $C(1,1)$ | 0 / 0 | 0 / 0 | 0 / 0 | 0 / 0 |
| $C(0,2)$ | 6.44E−05 / −0.003714383 | 0.000479295 / −0.006319448 | −0.006556157 / −0.00308044 | 0.00058781 / −0.007231889 |
| $C(3,0)$ | 0 / 0 | 0 / 0 | 0 / 0 | 0 / 0 |
| $C(2,1)$ | 9.90E−07 / −0.000267855 | 1.12E−05 / −0.0003299 | −8.96E−05 / −0.000311645 | 3.44E−05 / −0.000411137 |
| $C(1,2)$ | 0 / 0 | 0 / 0 | 0 / 0 | 0 / 0 |
| $C(0,3)$ | 6.53E−07 / −3.96E−05 | 4.47E−06 / 6.17E−05 | −0.000151771 / −9.88E−05 | −7.45E−05 / −0.000237863 |
| $C(4,0)$ | 1.74E−09 / −1.27E−06 | 3.67E−08 / −3.43E−06 | −1.14E−06 / −2.81E−07 | −1.33E−07 / −5.98E−07 |
| $C(3,1)$ | 0 / 0 | 0 / 0 | 0 / 0 | 0 / 0 |
| $C(2,2)$ | 1.45E−09 / −8.43E−06 | −3.22E−08 / 5.34E−06 | 1.66E−06 / 5.15E−06 | −3.22E−06 / −4.42E−06 |
| $C(1,3)$ | 0 / 0 | 0 / 0 | 0 / 0 | 0 / 0 |
| $C(0,4)$ | 9.23E−10 / −1.15E−06 | 6.53E−09 / 4.42E−08 | −2.26E−06 / 4.46E−06 | 3.53E−06 / 1.83E−06 |
| $C(5,0)$ | 0 / 0 | 0 / 0 | 0 / 0 | 0 / 0 |
| $C(4,1)$ | −7.69E−12 / −5.43E−08 | −6.71E−10 / −1.18E−07 | −3.91E−08 / 5.05E−08 | −6.01E−08 / 1.58E−07 |
| $C(3,2)$ | 0 / 0 | 0 / 0 | 0 / 0 | 0 / 0 |
| $C(2,3)$ | −2.36E−11 / −4.50E−07 | −5.08E−10 / −6.48E−07 | 2.23E−07 / 1.02E−08 | 2.35E−07 / 3.79E−07 |
| $C(1,4)$ | 0 / 0 | 0 / 0 | 0 / 0 | 0 / 0 |
| $C(0,5)$ | 2.00E−12 / −2.54E−07 | −1.89E−10 / −1.00E−07 | 2.36E−08 / −5.93E−08 | 8.50E−08 / −1.37E−07 |
| $C(6,0)$ | −3.37E−14 | −2.29E−12 | 5.78E−10 | 1.11E−09 |

TABLE 2-continued

|  | | | | |
|---|---|---|---|---|
|  | 3.39E-09 | 3.14E-09 | -1.15E-08 | -9.57E-09 |
| C(5,1) | 0 | 0 | 0 | 0 |
|  | 0 | 0 | 0 | 0 |
| C(4,2) | 1.45E-14 | 7.49E-12 | 4.08E-09 | 1.20E-08 |
|  | 1.05E-08 | 7.30E-09 | 8.52E-09 | 5.14E-09 |
| C(3,3) | 0 | 0 | 0 | 0 |
|  | 0 | 0 | 0 | 0 |
| C(2,4) | -1.35E-14 | 4.71E-12 | 1.05E-08 | 1.21E-08 |
|  | 2.32E-09 | -1.27E-08 | -1.73E-08 | 4.32E-09 |
| C(1,5) | 0 | 0 | 0 | 0 |
|  | 0 | 0 | 0 | 0 |
| C(0,6) | -4.56E-15 | 6.72E-13 | 2.82E-09 | -5.30E-09 |
|  | -3.26E-09 | 1.05E-08 | 1.19E-08 | 6.55E-09 |

(aspherical surface data 2)

| | |
|---|---|
| diffractive optical element third surface | three surfaces |
| order of diffraction | 1 |
| normalized wavelength | 546.074 |
| D(1,0) | 0 |
| D(0,1) | -0.000270669 |
| D(2,0) | -8.89E-07 |
| D(1,1) | 0 |
| D(0,2) | 4.69E-06 |
| D(3,0) | 0 |
| D(2,1) | -1.48E-08 |
| D(1,2) | 0 |
| D(0,3) | 6.19E-09 |
| D(4,0) | -1.65E-10 |
| D(3,1) | 0 |
| D(2,2) | -2.18E-10 |
| D(1,3) | 0 |
| D(0,4) | -6.54E-11 |
| D(5,0) | 0 |
| D(4,1) | 7.20E-12 |
| D(3,2) | 0 |
| D(2,3) | 3.07E-11 |
| D(1,4) | 0 |
| D(0,5) | -7.27E-12 |
| D(6,0) | 7.14E-14 |
| D(5,1) | 0 |
| D(4,2) | 3.30E-14 |
| D(3,3) | 0 |
| D(2,4) | 3.15E-14 |
| D(1,5) | 0 |
| D(0,6) | 1.40E-14 |
| D(7,0) | 0 |
| D(6,1) | 1.30E-15 |
| D(5,2) | 0 |
| D(4,3) | 5.09E-15 |
| D(3,4) | 0 |
| D(2,5) | 5.20E-15 |
| D(1,6) | 0 |
| D(0,7) | 1.39E-15 |
| D(8,0) | -3.70E-18 |
| D(7,1) | 0 |
| D(6,2) | -2.03E-18 |
| D(5,3) | 0 |
| D(4,4) | 1.41E-17 |
| D(3,5) | 0 |
| D(2,6) | 1.21E-17 |
| D(1,7) | 0 |
| D(0,8) | 2.14E-18 |

(corresponding values in conditional expressions)

| | |
|---|---|
| $\alpha_1 = C/2 + C(2,0) = -7.309 \times 10^{-4}$ | (fifth surface: coefficient of $x^2$) |
| $\beta_1 = C/2 + C(0,2) = -6.731 \times 10^{-4}$ | (fifth surface: coefficient of $y^2$) |
| $\alpha_2 = C/2 + C(2,0) = -4.872 \times 10^{-4}$ | (sixth surface: coefficient of $x^2$) |
| $\beta_2 = C/2 + C(0,2) = -1.011 \times 10^{-4}$ | (sixth surface: coefficient of $y^2$) |
| $\alpha_3 = C/2 + C(2,0) = 2.269 \times 10^{-3}$ | (seventh surface: coefficient of $x^2$) |
| $\beta_3 = C/2 + C(0,2) = -6.556 \times 10^{-3}$ | (seventh surface: coefficient of $y^2$) |
| $\alpha_4 = D(2,0) = -8.887 \times 10^{-7}$ | (third surface: coefficient of $x^2$) |
| $\beta_4 = D(0,2) = 4.693 \times 10^{-6}$ | (third surface: coefficient of $y^2$) |
| (A) $\beta_1/\alpha_1 = 0.921$ | |
| (B) $\beta_2/\alpha_2 = 0.208$ | |
| (C) $\beta_3/\alpha_3 = -2.889$ | |
| (D) $\beta_4/\alpha_4 = -5.281$ | |

Figure 11:
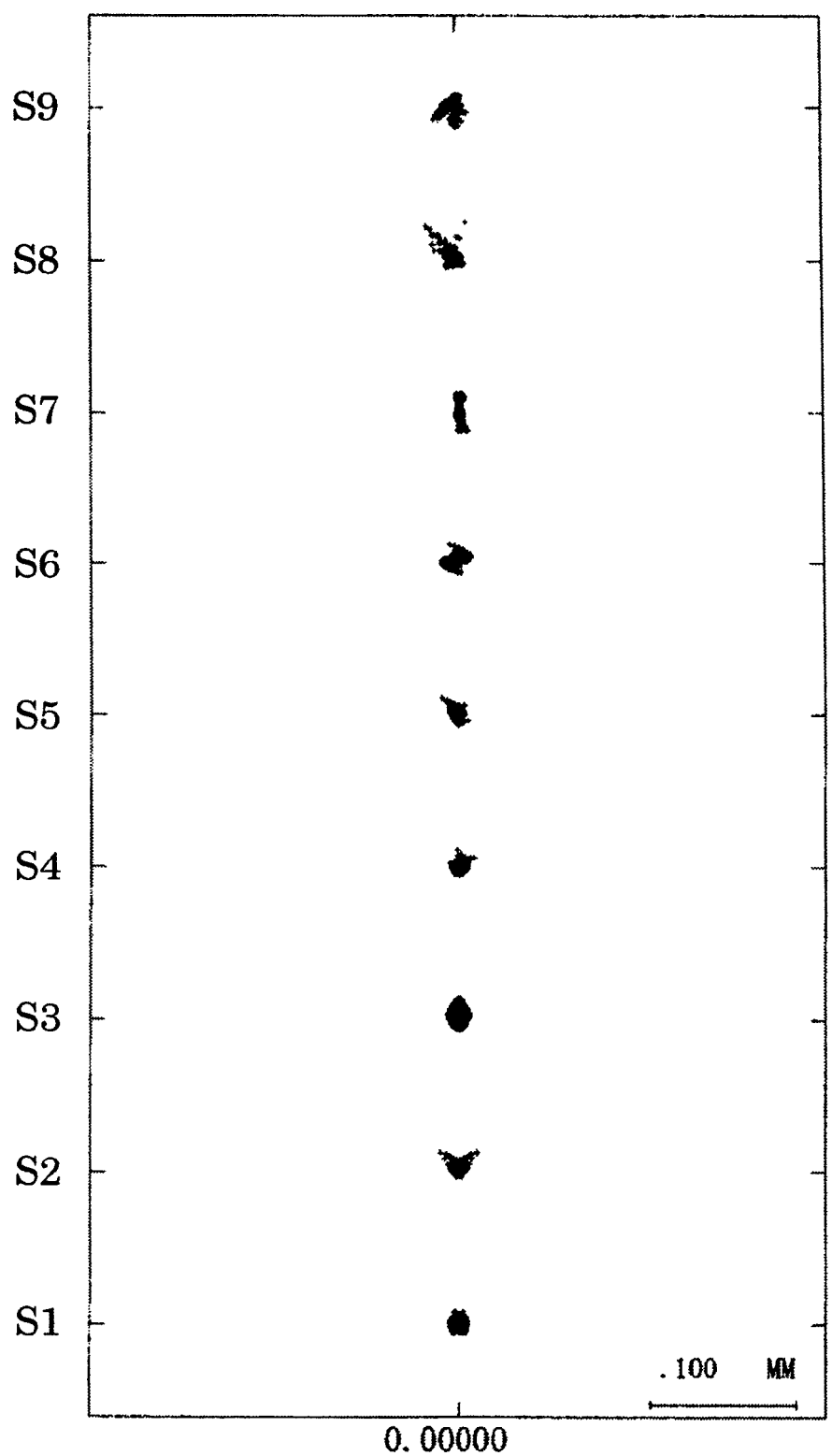
FIG. 11 presents a spot diagram indicating the aberration occurring in relation to the e-line in the second example.
Figure 12:
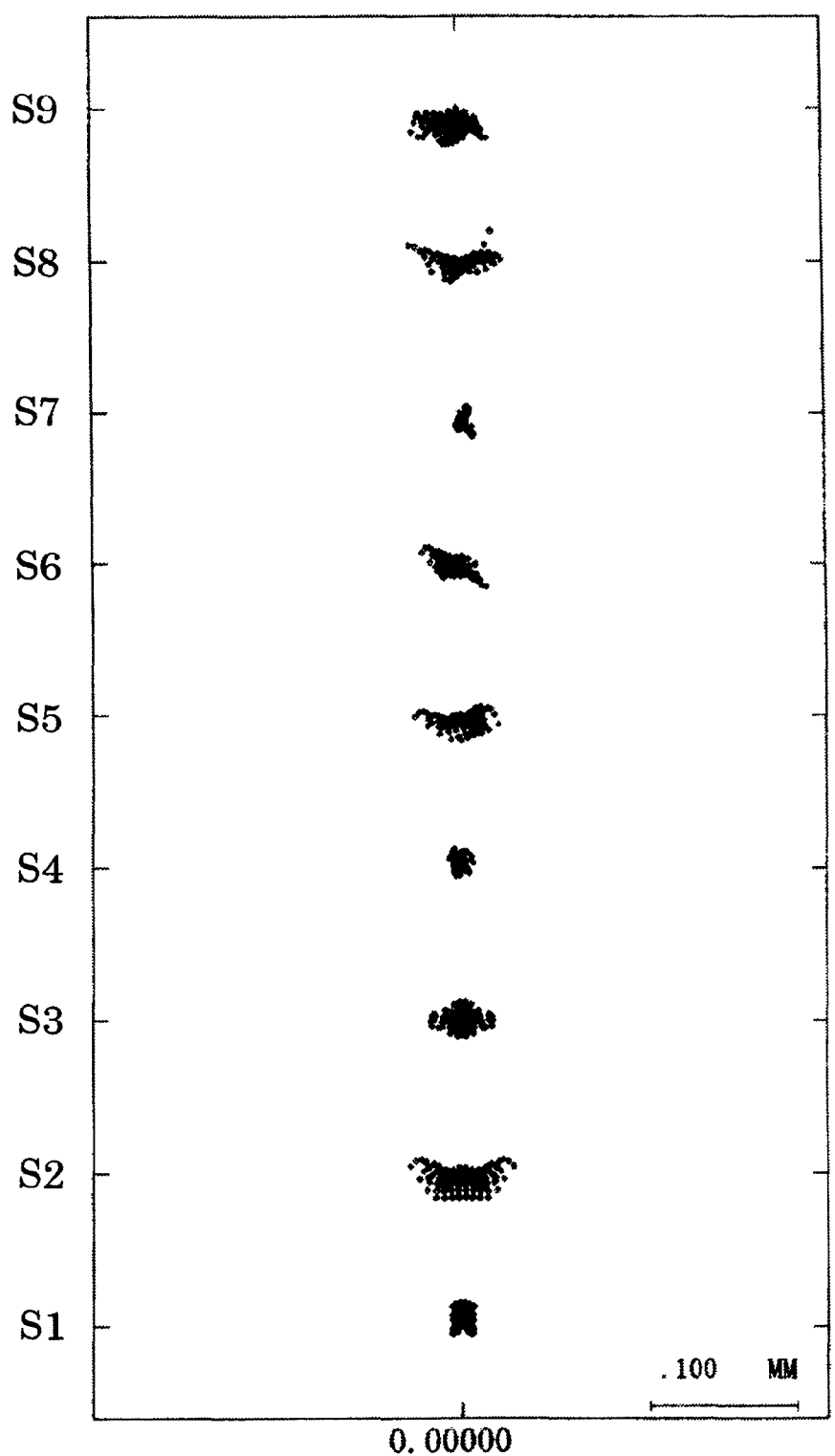
FIG. 12 presents a spot diagram indicating the aberration occurring in relation to the g-line in the second example.

FIG. 11 presents a spot diagram indicating the aberration manifesting in relation to the e-line in the second example. FIG. 12 presents a spot diagram indicating the aberration manifesting in relation to the g-line (wavelength: 430.83 nm) in the second example. FIG. 11 and FIG. 12 indicate that the sizes of the spots at the various image points S1 through S9, calculated for the e-line in correspondence to the second example, are sufficiently small, demonstrating that uniform and robust correction of aberration is achieved over the entire image plane IM, as in the first example. Furthermore, the spots at the various image points S1 through S9 each take on a substantially symmetrical shape, demonstrating that asymmetrical aberration is effectively corrected. While the sizes of the spots calculated for the g-line are somewhat greater than the spot sizes corresponding to the e-line, chromatic aberration is still corrected better than that at a standard camera lens.

Third Example

Figure 13:
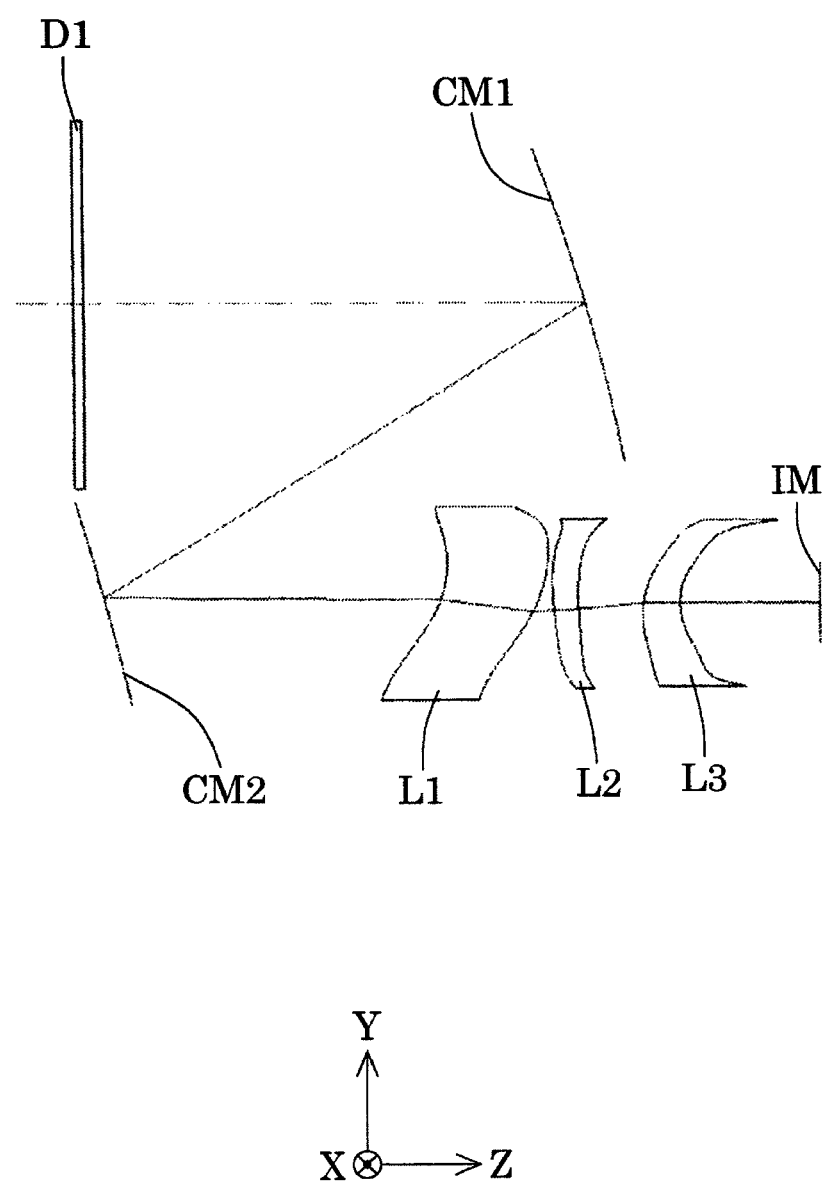
FIG. 13 is a schematic illustration showing the structure of the catadioptric imaging lens achieved in a third example in a sectional view taken along the YZ plane.
Figure 14:
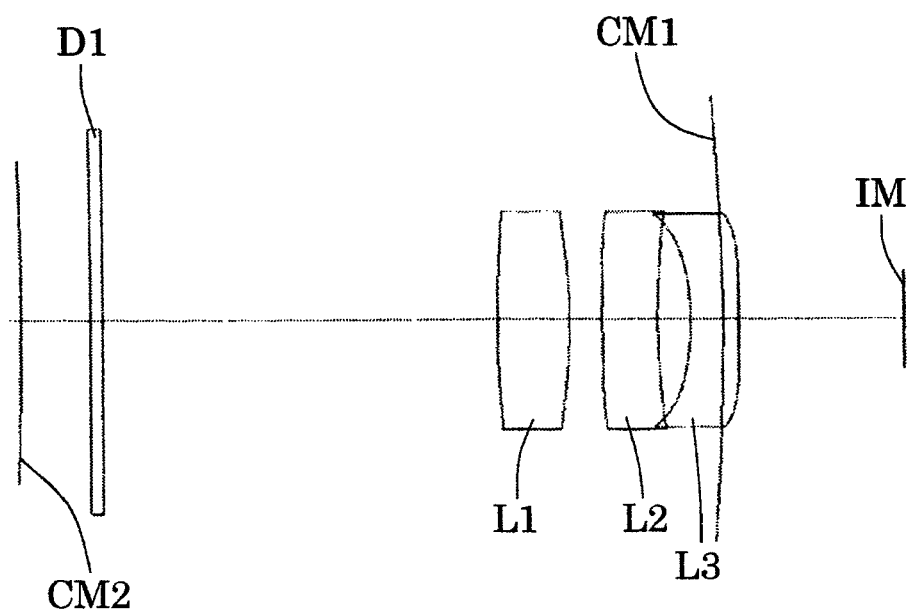
FIG. 14 is a schematic illustration showing the structure of the catadioptric imaging lens achieved in the third example in a sectional view taken along the XZ plane.
Figure 14:
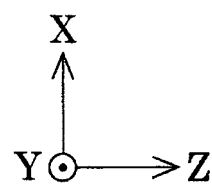

FIG. 13 is a schematic illustration showing the structure of the catadioptric imaging lens achieved in the third example in a sectional view taken along the YZ plane. FIG. 14 is a schematic illustration showing the structure of the catadioptric imaging lens achieved in the third example in a sectional view taken along the XZ plane. The values representing various technical factors pertaining to the catadioptric imaging lens achieved in the third example are listed in the following Table (3).

TABLE 3

| (optical member data) | | | |
|---|---|---|---|
| surface number | surface type | interval | glass material type |
| 1 | flat surface (aperture) | 3 | glass material 1 |
| 2 | flat surface | 0.01 | glass material 2 |
| 3 | diffractive surface | 0.01 | glass material 3 |
| 4 | flat surface | 150 | |
| 5 | free-form surface | −170 | reflective |
| 6 | free-form surface | 100 | reflective |
| 7 | free-form surface | 29.31220126 | glass material 4 |
| 8 | free-form surface | 4.731981832 | |
| 9 | free-form surface | 7.352609012 | glass material 5 |
| 10 | free-form surface | 19.4886019 | |
| 11 | free-form surface | 11.12471002 | glass material 5 |
| 12 | free-form surface | 42 | |
| image plane | | | |

| (aspherical surface data 1) | | | | |
|---|---|---|---|---|
| | surface number | | | |
| | 5 | 6 | 7 | 8 |
| | 9 | 10 | 11 | 12 |
| c | −0.0017203 | −0.001739129 | 0 | 0 |
| | 0 | 0 | 0 | 0 |
| k | 0 | 0 | 0 | 0 |
| | 0 | 0 | 0 | 0 |
| C(1,0) | 0 | 0 | 0 | 0 |
| | 1.80E−05 | 0 | 0 | 0 |
| C(0,1) | 0.005 | 0.01 | 0.410615162 | 0.41654513 |
| | −0.073984842 | −0.022430979 | 0.14006189 | 0 |
| C(2,0) | −9.81E−05 | −0.000770836 | 0.007644287 | 0.001816678 |
| | 0.001117861 | 0.010688925 | 0.023350765 | 0.025431562 |
| C(1,1) | 0 | 0 | 0 | 0 |
| | 0 | 0 | 0 | 0 |
| C(0,2) | 6.66E−05 | 0.000493262 | −0.018660971 | −0.015498266 |
| | 0.002797845 | 0.004581191 | 0.019375456 | 0.026302171 |
| C(3,0) | 0 | 0 | 0 | 0 |
| | 0 | 0 | 0 | 0 |
| C(2,1) | 1.07E−06 | 1.88E−05 | −6.16E−05 | 0.000320128 |
| | −0.000663145 | −0.001299322 | −0.000107349 | 0.000169382 |
| C(1,2) | 0 | 0 | 0 | 0 |
| | 0 | 0 | 0 | 0 |
| C(0,3) | 6.35E−07 | 3.78E−06 | −1.79E−05 | 5.51E−05 |
| | 0.000131356 | 8.82E−05 | 6.95E−05 | 0.000177 |
| C(4,0) | 6.99E−10 | −1.26E−08 | 9.93E−07 | 2.78E−06 |
| | 9.11E−06 | 8.88E−06 | −3.90E−06 | −7.19E−06 |
| C(3,1) | 0 | 0 | 0 | 0 |
| | 0 | 0 | 0 | 0 |
| C(2,2) | −2.43E−09 | −3.15E−07 | 9.05E−06 | 1.61E−05 |
| | 2.75E−07 | −2.18E−06 | −1.28E−05 | −3.29E−05 |
| C(1,3) | 0 | 0 | 0 | 0 |
| | 0 | 0 | 0 | 0 |
| C(0,4) | 7.58E−10 | 3.97E−09 | 1.27E−05 | 1.03E−05 |
| | 8.23E−06 | −2.50E−07 | 5.59E−07 | 8.50E−07 |
| C(5,0) | 0 | 0 | 0 | 0 |
| | 0 | 0 | 0 | 0 |
| C(4,1) | −3.45E−12 | 1.17E−11 | 2.33E−08 | −1.90E−07 |
| | 9.97E−07 | 1.29E−06 | −1.36E−07 | −5.01E−07 |

TABLE 3-continued

| | | | | |
|---|---|---|---|---|
| C(3,2) | 0 | 0 | 0 | 0 |
| | 0 | 0 | 0 | 0 |
| C(2,3) | 4.81E−12 | 3.64E−09 | 2.66E−08 | −1.04E−07 |
| | 5.58E−07 | 1.17E−06 | −8.29E−08 | −7.94E−07 |
| C(1,4) | 0 | 0 | 0 | 0 |
| | 0 | 0 | 0 | 0 |
| C(0,5) | 3.02E−12 | 2.51E−10 | −5.74E−07 | −9.94E−08 |
| | 2.42E−07 | 3.68E−07 | 1.50E−07 | −2.02E−07 |
| C(6,0) | −3.71E−14 | −9.92E−12 | 6.15E−10 | −1.76E−09 |
| | −7.86E−09 | 3.34E−09 | 8.55E−09 | 1.64E−08 |
| C(5,1) | 0 | 0 | 0 | 0 |
| | 0 | 0 | 0 | 0 |
| C(4,2) | 3.64E−13 | 7.27E−11 | −4.79E−09 | −1.49E−08 |
| | −1.07E−09 | 2.81E−09 | 4.82E−10 | 2.74E−09 |
| C(3,3) | 0 | 0 | 0 | 0 |
| | 0 | 0 | 0 | 0 |
| C(2,4) | −1.01E−13 | −4.35E−11 | −8.99E−09 | −2.16E−08 |
| | 7.50E−09 | 1.10E−08 | −5.47E−10 | 3.29E−08 |
| C(1,5) | 0 | 0 | 0 | 0 |
| | 0 | 0 | 0 | 0 |
| C(0,6) | −7.63E−15 | −4.05E−12 | −7.58E−09 | −3.18E−09 |
| | −2.44E−11 | 5.52E−09 | −1.73E−08 | −3.70E−08 |
| C(7,0) | 0 | 0 | 0 | 0 |
| | 0 | 0 | 0 | 0 |
| C(6,1) | 3.43E−16 | 2.09E−13 | −5.61E−11 | 5.42E−11 |
| | −1.14E−10 | 1.29E−10 | 9.56E−11 | 2.05E−10 |
| C(5,2) | 0 | 0 | 0 | 0 |
| | 0 | 0 | 0 | 0 |
| C(4,3) | −1.63E−17 | −1.32E−12 | −1.28E−10 | 6.87E−11 |
| | −1.00E−09 | −2.11E−09 | 1.49E−10 | 1.65E−09 |
| C(3,4) | 0 | 0 | 0 | 0 |
| | 0 | 0 | 0 | 0 |
| C(2,5) | −1.77E−19 | 4.65E−13 | −4.52E−11 | −7.71E−10 |
| | −6.81E−10 | −9.02E−10 | −2.32E−10 | 6.16E−10 |
| C(1,6) | 0 | 0 | 0 | 0 |
| | 0 | 0 | 0 | 0 |
| C(0,7) | 1.20E−16 | 1.57E−13 | 7.69E−10 | −4.15E−10 |
| | −7.11E−10 | −5.62E−10 | −2.16E−10 | 6.64E−10 |
| C(8,0) | 3.08E−18 | 1.94E−14 | −6.37E−13 | −1.27E−12 |
| | 6.35E−12 | −6.12E−12 | −7.24E−12 | −2.51E−11 |
| C(7,1) | 0 | 0 | 0 | 0 |
| | 0 | 0 | 0 | 0 |
| C(6,2) | 7.51E−18 | −1.79E−14 | −1.53E−13 | 1.08E−11 |
| | −5.62E−12 | −3.51E−11 | 1.56E−11 | 6.00E−11 |
| C(5,3) | 0 | 0 | 0 | 0 |
| | 0 | 0 | 0 | 0 |
| C(4,4) | 2.71E−17 | 1.29E−14 | 9.40E−12 | 2.64E−11 |
| | 2.71E−11 | 4.15E−11 | 1.29E−11 | −3.77E−11 |
| C(3,5) | 0 | 0 | 0 | 0 |
| | 0 | 0 | 0 | 0 |
| C(2,6) | 4.80E−18 | −1.31E−14 | −4.67E−12 | −1.14E−11 |
| | −3.26E−11 | 3.14E−11 | −1.52E−11 | −4.94E−11 |
| C(1,7) | 0 | 0 | 0 | 0 |
| | 0 | 0 | 0 | 0 |
| C(0,8) | −3.57E−18 | −3.75E−15 | 1.77E−12 | −7.09E−12 |
| | −6.19E−13 | 1.39E−11 | −4.41E−11 | −1.24E−10 |
| C(9,0) | 0 | 0 | 0 | 0 |
| | 0 | 0 | 0 | 0 |
| C(8,1) | 0 | 0 | −3.89E−15 | −7.57E−14 |
| | −8.53E−14 | −2.78E−14 | −2.90E−13 | −5.20E−13 |
| C(7,2) | 0 | 0 | 0 | 0 |
| | 0 | 0 | 0 | 0 |
| C(6,3) | 0 | 0 | 5.86E−14 | −3.65E−14 |
| | 6.88E−13 | 1.39E−12 | −1.07E−14 | −1.46E−12 |
| C(5,4) | 0 | 0 | 0 | 0 |
| | 0 | 0 | 0 | 0 |
| C(4,5) | 0 | 0 | 1.34E−13 | 1.10E−13 |
| | −4.28E−14 | 1.37E−12 | 1.91E−12 | 3.86E−12 |
| C(3,6) | 0 | 0 | 0 | 0 |
| | 0 | 0 | 0 | 0 |
| C(2,7) | 0 | 0 | 1.95E−13 | 2.23E−13 |
| | 2.50E−13 | 1.02E−12 | 5.69E−14 | −1.54E−12 |
| C(1,8) | 0 | 0 | 0 | 0 |
| | 0 | 0 | 0 | 2.18E−14 |
| C(0,9) | 0 | 0 | −3.34E−13 | 8.19E−14 |
| | 2.96E−15 | 2.34E−13 | 4.36E−13 | 0 |
| C(10,0) | 0 | 0 | −1.70E−16 | −2.20E−16 |
| | −3.24E−15 | 7.00E−15 | 3.52E−15 | 1.91E−14 |
| C(9,1) | 0 | 0 | 0 | 0 |
| | 0 | 0 | 0 | 0 |

TABLE 3-continued

| | | | | |
|---|---|---|---|---|
| C(8,2) | 0 | 0 | 2.87E−16 | −6.37E−15 |
| | 1.44E−15 | 2.63E−14 | −1.94E−14 | −6.83E−14 |
| C(7,3) | 0 | 0 | 0 | 0 |
| | 0 | 0 | 0 | 0 |
| C(6,4) | 0 | 0 | −2.04E−15 | −8.04E−15 |
| | −2.08E−14 | −1.20E−14 | −2.48E−14 | −3.85E−14 |
| C(5,5) | 0 | 0 | 0 | 0 |
| | 0 | 0 | 0 | 0 |
| C(4,6) | 0 | 0 | 2.86E−15 | −5.18E−15 |
| | −1.59E−15 | −2.11E−14 | −3.52E−14 | −4.80E−14 |
| C(3,7) | 0 | 0 | 0 | 0 |
| | 0 | 0 | 0 | 0 |
| C(2,8) | 0 | 0 | 1.94E−14 | 5.02E−15 |
| | −1.13E−14 | −4.88E−14 | 1.36E−13 | 3.50E−13 |
| C(1,9) | 0 | 0 | 0 | 0 |
| | 0 | 0 | 0 | 0 |
| C(0,10) | 0 | 0 | 2.55E−15 | −2.44E−15 |
| | −7.33E−15 | −7.28E−16 | 1.05E−13 | 3.76E−13 |

(aspherical surface data 2)

| | |
|---|---|
| diffractive optical element third surface | three surfaces |
| order of diffraction | 1 |
| normalized wavelength | 546.074 |
| D(1,0) | 0.0000E+00 |
| D(0,1) | 1.5122E−04 |
| D(2,0) | −1.2460E−06 |
| D(1,1) | 0.0000E+00 |
| D(0,2) | 2.7280E−06 |
| D(3,0) | 0.0000E+00 |
| D(2,1) | 2.4979E−08 |
| D(1,2) | 0.0000E+00 |
| D(0,3) | −4.1350E−09 |
| D(4,0) | 4.8016E−10 |
| D(3,1) | 0.0000E+00 |
| D(2,2) | 1.1327E−09 |
| D(1,3) | 0.0000E+00 |
| D(0,4) | −8.4044E−11 |
| D(5,0) | 0.0000E+00 |
| D(4,1) | 1.4052E−12 |
| D(3,2) | 0.0000E+00 |
| D(2,3) | 8.2525E−12 |
| D(1,4) | 0.0000E+00 |
| D(0,5) | 2.0223E−13 |
| D(6,0) | −4.4387E−13 |
| D(5,1) | 0.0000E+00 |
| D(4,2) | −1.7051E−12 |
| D(3,3) | 0.0000E+00 |
| D(2,4) | −6.4118E−13 |
| D(1,5) | 0.0000E+00 |
| D(0,6) | 1.5820E−13 |
| D(7,0) | 0.0000E+00 |
| D(6,1) | 4.0300E−16 |
| D(5,2) | 0.0000E+00 |
| D(4,3) | −1.1789E−15 |
| D(3,4) | 0.0000E+00 |
| D(2,5) | −7.8965E−16 |
| D(1,6) | 0.0000E+00 |
| D(0,7) | 9.2473E−16 |
| D(8,0) | 2.3021E−16 |
| D(7,1) | 0.0000E+00 |
| D(6,2) | 8.3461E−16 |
| D(5,3) | 0.0000E+00 |
| D(4,4) | 1.0796E−15 |
| D(3,5) | 0.0000E+00 |
| D(2,6) | 2.3223E−16 |
| D(1,7) | 0.0000E+00 |
| D(0,8) | −8.2387E−17 |
| D(9,0) | 0.0000E+00 |
| D(8,1) | −2.8493E−19 |
| D(7,2) | 0.0000E+00 |
| D(6,3) | −6.6746E−19 |
| D(5,4) | 0.0000E+00 |
| D(4,5) | 6.5967E−19 |
| D(3,6) | 0.0000E+00 |
| D(2,7) | −2.7388E−19 |

TABLE 3-continued

| | |
|---|---|
| D(1,8) | 0.0000E+00 |
| D(0,9) | −2.3496E−19 |
| D(10,0) | −3.7832E−20 |
| D(9,1) | 0.0000E+00 |
| D(8,2) | −1.7353E−19 |
| D(7,3) | 0.0000E+00 |
| D(6,4) | −3.4733E−19 |
| D(5,5) | 0.0000E+00 |
| D(4,6) | −2.5068E−19 |
| D(3,7) | 0.0000E+00 |
| D(2,8) | −5.7289E−21 |
| D(1,9) | 0.0000E+00 |
| D(0,10) | 1.6617E−20 |

(corresponding values in conditional expressions)

| | |
|---|---|
| $\alpha_1 = C/2 + C(2,0) = -9.583 \times 10^{-4}$ | (fifth surface: coefficient of $x^2$) |
| $\beta_1 = C/2 + C(0,2) = -7.937 \times 10^{-4}$ | (fifth surface: coefficient of $y^2$) |
| $\alpha_2 = C/2 + C(2,0) = -1.640 \times 10^{-3}$ | (sixth surface: coefficient of $x^2$) |
| $\beta_2 = C/2 + C(0,2) = -3.763 \times 10^{-4}$ | (sixth surface: coefficient of $y^2$) |
| $\alpha_3 = C/2 + C(2,0) = 7.644 \times 10^{-3}$ | (seventh surface: coefficient of $x^2$) |
| $\beta_3 = C/2 + C(0,2) = -1.866 \times 10^{-2}$ | (seventh surface: coefficient of $y^2$) |
| $\alpha_4 = D(2,0) = -1.246 \times 10^{-6}$ | (third surface: coefficient of $x^2$) |
| $\beta_4 = D(0,2) = 2.728 \times 10^{-6}$ | (third surface: coefficient of $y^2$) |
| (A) $\beta_1/\alpha_1 = 0.828$ | |
| (B) $\beta_2/\alpha_2 = 0.229$ | |
| (C) $\beta_3/\alpha_3 = -2.441$ | |
| (D) $\beta_4/\alpha_4 = -2.189$ | |

Figure 15:
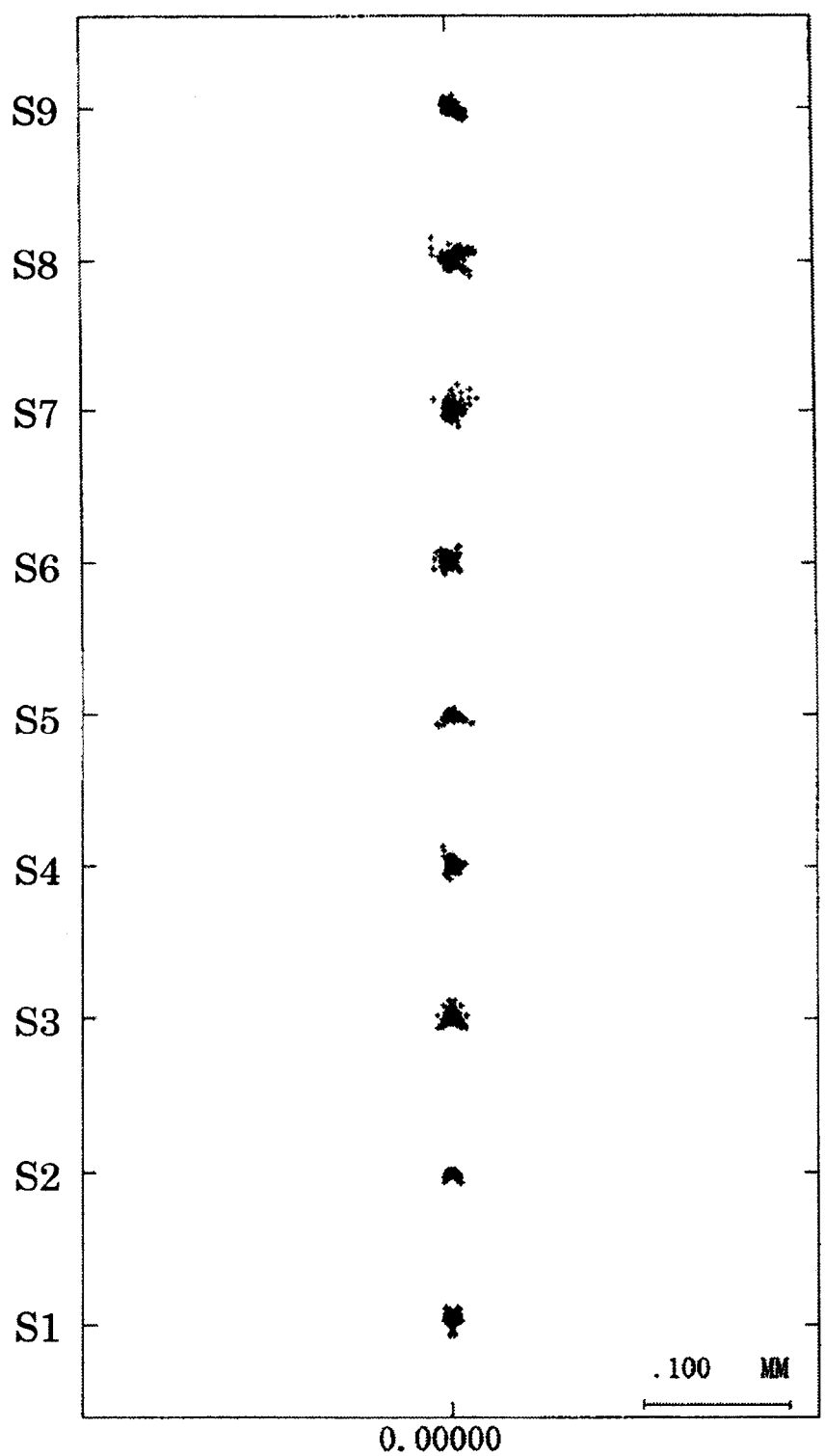
FIG. 15 presents a spot diagram indicating the aberration occurring in relation to the e-line in the third example.
Figure 16:
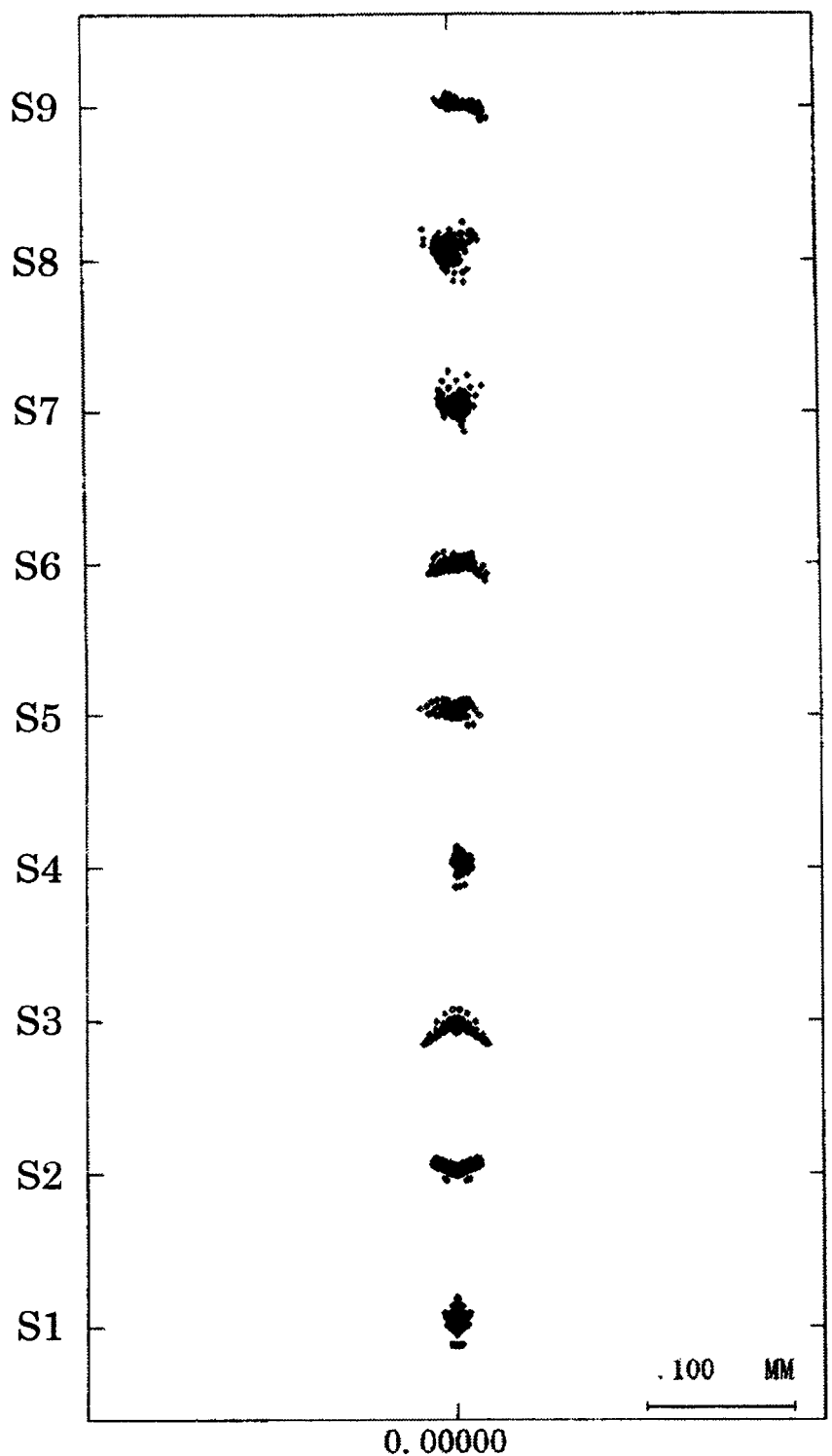
FIG. 16 presents a spot diagram indicating the aberration occurring in relation to the g-line in the third example.

FIG. 15 presents a spot diagram indicating the aberration manifesting in relation to the e-line in the third example. FIG. 16 presents a spot diagram indicating the aberration manifesting in relation to the g-line (wavelength: 430.83 nm) in the third example. FIG. 15 and FIG. 16 indicate that the sizes of the spots at the various image points S1 through S9, calculated for the e-line in correspondence to the third example, are sufficiently small, demonstrating that uniform and robust correction of aberration is achieved over the entire image plane IM, as in the first exampleembodiment and the second embodiment. Furthermore, the spots at the various image points S1 through S9 each take on a substantially symmetrical shape, demonstrating that asymmetrical aberration is effectively corrected. While the sizes of the spots calculated for the g-line are somewhat greater than the spot sizes corresponding to the e-line, chromatic aberration is still corrected better than that at a standard camera lens.

Fourth Example

Figure 17:
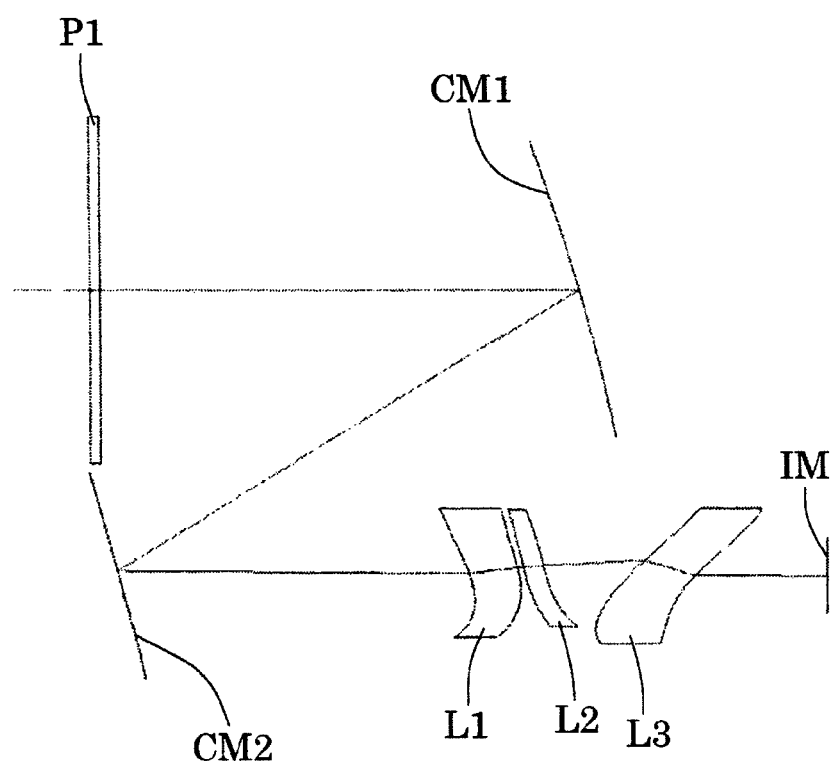
FIG. 17 is a schematic illustration showing the structure of the catadioptric imaging lens achieved in a fourth example in a sectional view taken along the YZ plane.
Figure 17:
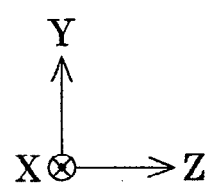
Figure 18:
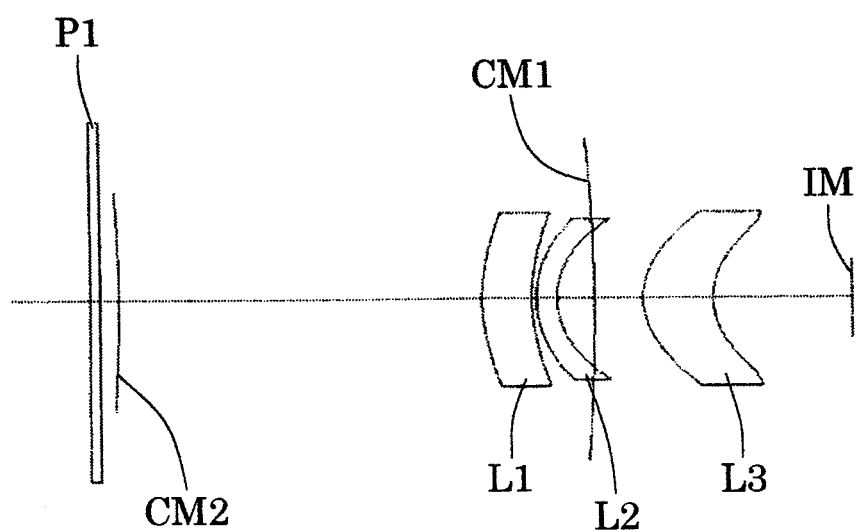
FIG. 18 is a schematic illustration showing the structure of the catadioptric imaging lens achieved in the fourth example in a sectional view taken along the XZ plane.
Figure 18:
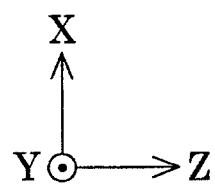

FIG. 17 is a schematic illustration showing the structure of the catadioptric imaging lens achieved in the fourth example in a sectional view taken along the YZ plane. FIG. 18 is a schematic illustration showing the structure of the catadioptric imaging lens achieved in the fourth example in a sectional view taken along the XZ plane. The values representing various technical factors pertaining to the catadioptric imaging lens achieved in the fourth example are listed in the following Table (4). The fourth example is distinguishable from the first through third examples in that a plane parallel plate P1 is disposed on the object side relative to the concave reflecting mirror CM1. This means that the first surface and the second surface in the optical member data section in Table (4) are the entry surface and the exit surface of the plane parallel plate P1. The third surface is the reflecting surface of the concave reflecting mirror CM1 and the fourth surface is the reflecting surface of the convex reflecting mirror CM2. The fifth through tenth surfaces respectively correspond to the entry surface and the exit surface of the lens L1, the entry surface and the exit surface of the lens L2, and the entry surface and the exit surface of the lens L3.

TABLE 4

(optical member data)

| surface number | surface type | interval | glass material type |
|---|---|---|---|
| 1 | flat surface (aperture) | 3.02 | glass material 1 |
| 2 | flat surface | 150 | |
| 3 | free-form surface | −170 | reflective |
| 4 | free-form surface | 110 | reflective |
| 5 | free-form surface | 14.96468432 | glass material 4 |
| 6 | free-form surface | 2 | |
| 7 | free-form surface | 6.388036119 | glass material 5 |
| 8 | free-form surface | 25.66280063 | |

TABLE 4-continued

| | | | | |
|---|---|---|---|---|
| 9 | free-form surface | 20.95997408 | glass material 4 | |
| 10 | free-form surface | 42 | | |
| image plane | | | | |

(aspherical surface data 1)

| | surface number | | | |
|---|---|---|---|---|
| | 3 / 7 | 4 / 8 | 5 / 9 | 6 / 10 |
| c | −0.001625169 | −0.001397205 | 0 | 0 |
| | 0 | 0 | 0 | 0 |
| k | 0 | 0 | 0 | 0 |
| | 0 | 0 | 0 | 0 |
| C(1,0) | 0 | 0 | 0 | 0 |
| | −8.97E−07 | 0 | 0 | 0 |
| C(0,1) | 0.005 | 0.01 | −0.339073085 | −0.18003507 |
| | −0.273356922 | −0.271138579 | 0.950675346 | 0.961768447 |
| C(2,0) | −7.57E−05 | −0.000373453 | 0.009067643 | 0.009340478 |
| | 0.017927242 | 0.02469633 | 0.025292591 | 0.02609359 |
| C(1,1) | 0 | 0 | 0 | 0 |
| | 0 | 0 | 0 | 0 |
| C(0,2) | 7.73E−05 | 0.000456845 | −0.014249374 | −0.015524402 |
| | 0.005001691 | 0.00531698 | 0.014689266 | 0.019317651 |
| C(3,0) | 0 | 0 | 0 | 0 |
| | 0 | 0 | 0 | 0 |
| C(2,1) | 1.45E−06 | 1.57E−05 | 0.000425109 | 0.000773584 |
| | −0.000599991 | −0.001219065 | −0.000387117 | −0.000667026 |
| C(1,2) | 0 | 0 | 0 | 0 |
| | 0 | 0 | 0 | 0 |
| C(0,3) | 5.57E−07 | 2.51E−06 | 0.000557857 | 0.000614464 |
| | −0.000369679 | −0.000660473 | −0.000247853 | −0.000569555 |
| C(4,0) | 1.29E−09 | 1.63E−08 | −1.66E−06 | −2.58E−06 |
| | 2.88E−06 | 7.06E−06 | −1.70E−06 | −1.62E−08 |
| C(3,1) | 0 | 0 | 0 | 0 |
| | 0 | 0 | 0 | 0 |
| C(2,2) | 1.20E−09 | −6.77E−08 | −3.39E−06 | 9.86E−06 |
| | 1.77E−05 | 3.97E−05 | 8.62E−06 | 2.58E−06 |
| C(1,3) | 0 | 0 | 0 | 0 |
| | 0 | 0 | 0 | 0 |
| C(0,4) | 1.43E−09 | 2.59E−08 | −5.12E−06 | 1.11E−06 |
| | 1.13E−05 | 2.16E−05 | −7.30E−06 | −1.17E−05 |
| C(5,0) | 0 | 0 | 0 | 0 |
| | 0 | 0 | 0 | 0 |
| C(4,1) | 1.63E−11 | 1.45E−09 | −2.30E−07 | −4.05E−07 |
| | 1.84E−07 | 1.72E−07 | 2.44E−07 | 6.08E−07 |
| C(3,2) | 0 | 0 | 0 | 0 |
| | 0 | 0 | 0 | 0 |
| C(2,3) | 7.91E−12 | 1.18E−10 | −6.04E−07 | −1.10E−06 |
| | 4.50E−07 | 2.36E−07 | −4.20E−07 | 2.02E−09 |
| C(1,4) | 0 | 0 | 0 | 0 |
| | 0 | 0 | 0 | 0 |
| C(0,5) | −2.89E−12 | −4.15E−10 | 5.73E−08 | −1.37E−07 |
| | 1.73E−07 | −6.51E−08 | −2.02E−07 | 3.46E−07 |
| C(6,0) | −2.71E−15 | −4.03E−12 | 1.66E−10 | −3.89E−11 |
| | 1.48E−09 | 5.12E−09 | 4.35E−09 | 1.02E−08 |
| C(5,1) | 0 | 0 | 0 | 0 |
| | 0 | 0 | 0 | 0 |
| C(4,2) | 8.64E−14 | −3.83E−12 | 4.26E−10 | −1.17E−08 |
| | −1.35E−08 | −2.51E−08 | −3.55E−10 | −9.50E−09 |
| C(3,3) | 0 | 0 | 0 | 0 |
| | 0 | 0 | 0 | 0 |
| C(2,4) | 1.18E−13 | 1.59E−11 | −3.81E−09 | −2.09E−08 |
| | −2.62E−08 | −1.70E−08 | 2.58E−09 | −3.66E−08 |
| C(1,5) | 0 | 0 | 0 | 0 |
| | 0 | 0 | 0 | 0 |
| C(0,6) | 4.95E−14 | 5.90E−12 | −8.91E−09 | 9.68E−10 |
| | −1.45E−08 | −1.32E−08 | −1.82E−08 | −1.17E−08 |
| C(7,0) | 0 | 0 | 0 | 0 |
| | 0 | 0 | 0 | 0 |
| C(6,1) | −4.69E−16 | −6.02E−13 | 1.69E−10 | 3.99E−10 |
| | −1.07E−10 | −5.74E−10 | −1.77E−10 | −5.05E−10 |
| C(5,2) | 0 | 0 | 0 | 0 |
| | 0 | 0 | 0 | 0 |
| C(4,3) | 2.26E−16 | −2.56E−13 | 7.37E−10 | 1.31E−09 |
| | 5.07E−11 | 4.67E−10 | 4.04E−10 | 1.41E−10 |
| C(3,4) | 0 | 0 | 0 | 0 |
| | 0 | 0 | 0 | 0 |

TABLE 4-continued

| | | | | |
|---|---|---|---|---|
| C(2,5) | 8.15E−16 | 1.27E−13 | 7.71E−10 | 9.18E−10 |
| | 2.78E−11 | −3.43E−10 | 3.06E−10 | 3.99E−10 |
| C(1,6) | 0 | 0 | 0 | 0 |
| | 0 | 0 | 0 | 0 |
| C(0,7) | 8.43E−17 | 1.33E−14 | 2.95E−10 | 3.65E−11 |
| | −1.16E−10 | −7.49E−11 | −6.19E−10 | −4.22E−11 |
| C(8,0) | 3.28E−18 | 4.75E−15 | 2.43E−15 | 1.31E−12 |
| | −7.40E−13 | −2.65E−12 | −4.81E−12 | −2.89E−11 |
| C(7,1) | 0 | 0 | 0 | 0 |
| | 0 | 0 | 0 | 0 |
| C(6,2) | −1.73E−18 | 7.56E−15 | −4.63E−12 | 1.42E−11 |
| | −4.88E−12 | −1.09E−11 | −6.50E−12 | −2.35E−11 |
| C(5,3) | 0 | 0 | 0 | 0 |
| | 0 | 0 | 0 | 0 |
| C(4,4) | −2.06E−17 | −8.03E−15 | −1.34E−11 | 2.63E−11 |
| | 4.30E−11 | 1.21E−11 | −3.02E−11 | −2.03E−11 |
| C(3,5) | 0 | 0 | 0 | 0 |
| | 0 | 0 | 0 | 0 |
| C(2,6) | −2.58E−17 | −1.30E−14 | −2.83E−12 | 9.17E−12 |
| | 2.77E−11 | 2.92E−11 | −2.55E−11 | −5.52E−11 |
| C(1,7) | 0 | 0 | 0 | 0 |
| | 0 | 0 | 0 | 0 |
| C(0,8) | −3.23E−18 | −1.46E−15 | −5.71E−12 | −1.04E−11 |
| | 3.72E−13 | 6.08E−12 | 5.56E−12 | −1.56E−12 |

(corresponding values in conditional expressions)

Figure 19:
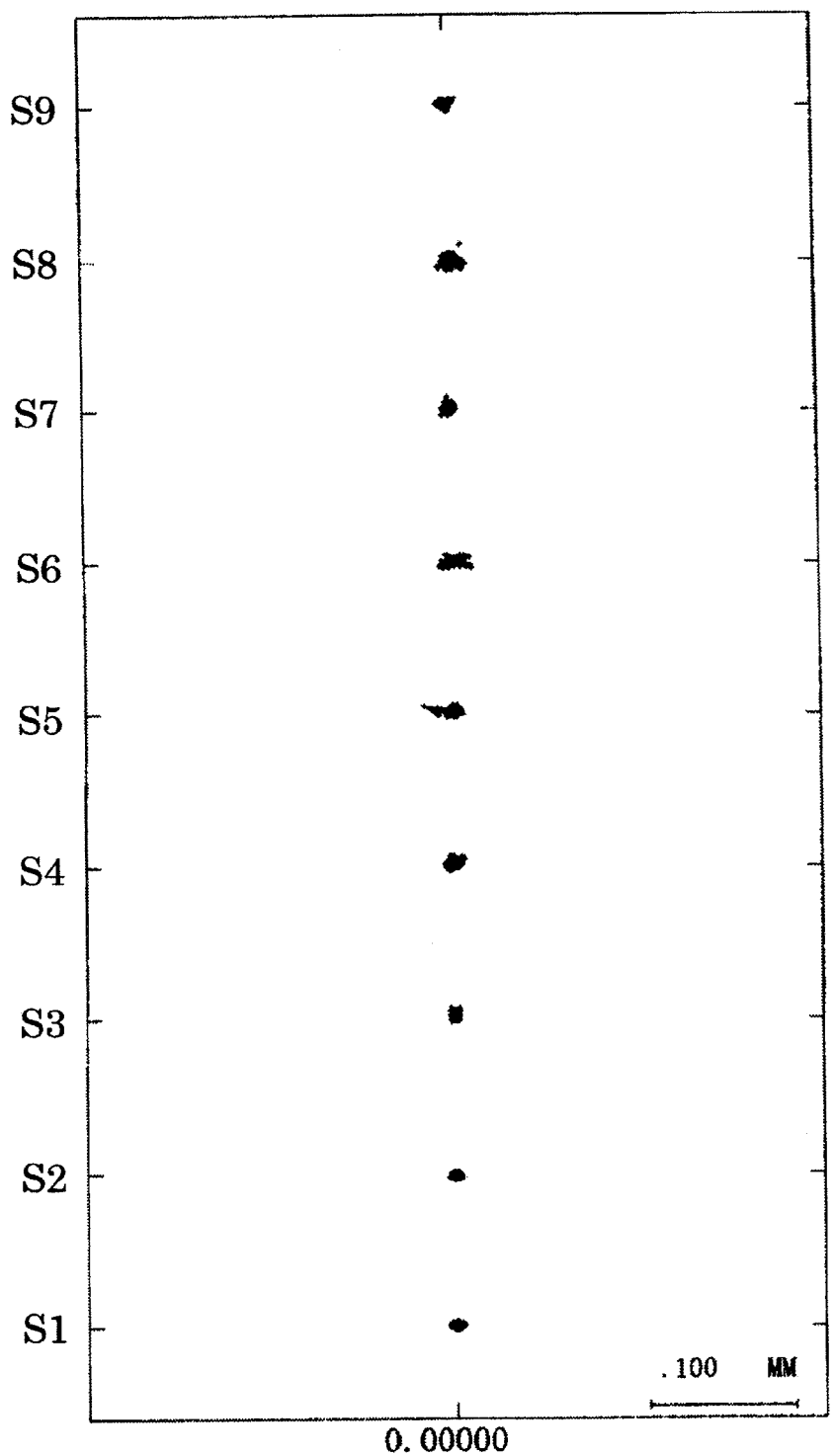
FIG. 19 presents a spot diagram indicating the aberration occurring in relation to the e-line in the fourth example.
Figure 20:
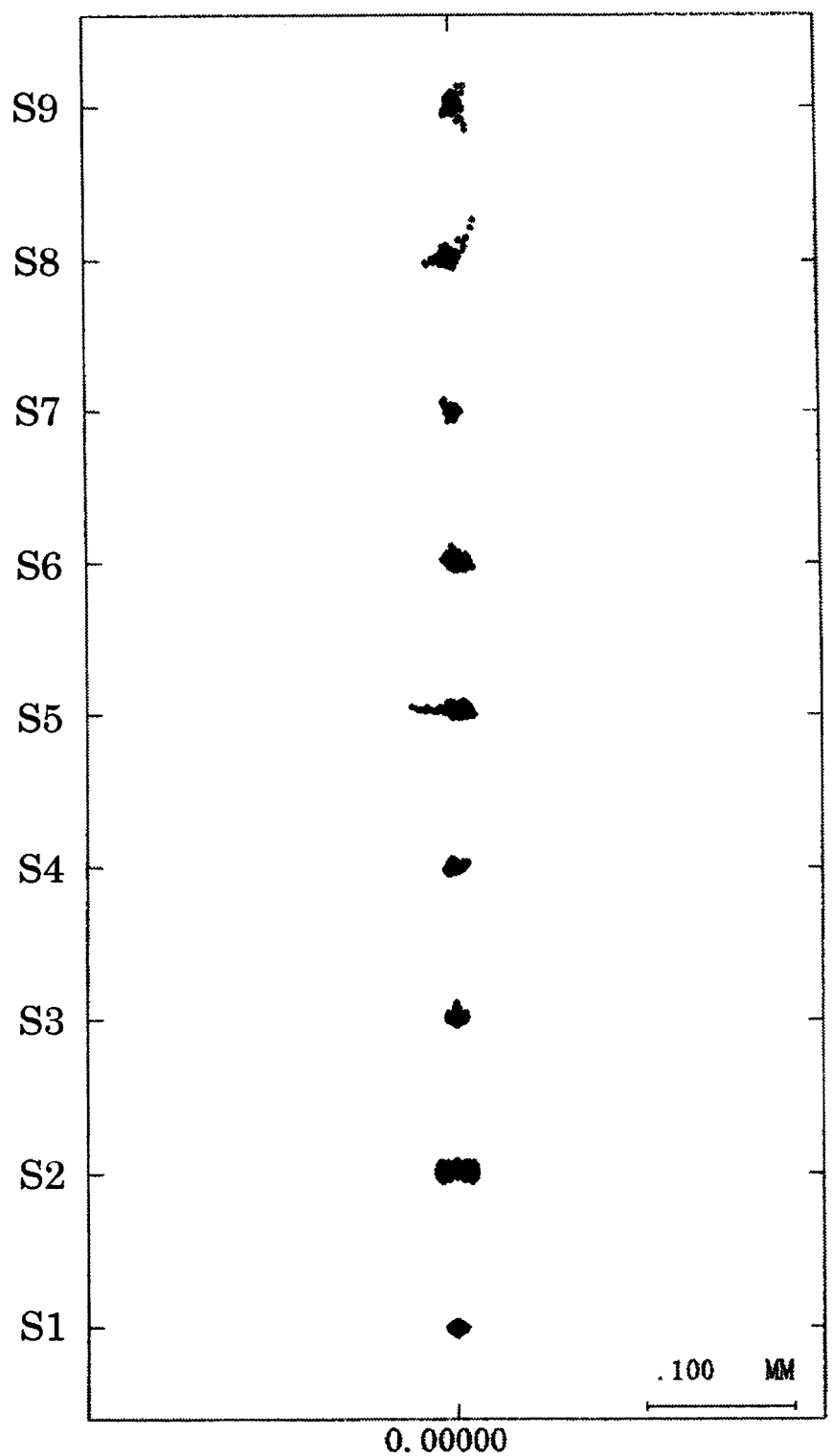
FIG. 20 presents a spot diagram indicating the aberration occurring in relation to the g-line in the fourth example.

$\alpha 1 = C/2 + C(2,0) = -8.882 \times 10^{-4}$ (third surface: coefficient of $x^2$)
$\beta 1 = C/2 + C(0,2) = -7.353 \times 10^{-4}$ (third surface: coefficient of $y^2$)
$\alpha 2 = C/2 + C(2,0) = -1.072 \times 10^{-3}$ (fourth surface: coefficient of $x^2$)
$\beta 2 = C/2 + C(0,2) = -2.418 \times 10^{-4}$ (fourth surface: coefficient of $y^2$)
$\alpha 3 = C/2 + C(2,0) = 9.068 \times 10^{-3}$ (fifth surface: coefficient of $x^2$)
$\beta 3 = C/2 + C(0,2) = -1.425 \times 10^{-3}$ (fifth surface: coefficient of $y^2$)
(A) $\beta 1/\alpha 1 = 0.8278$
(B) $\beta 2/\alpha 2 = 0.2256$
(C) $\beta 3/\alpha 3 = -1.571$ FIG. 19 presents a spot diagram indicating the aberration manifesting in relation to the e-line in the fourth example. FIG. 20 presents a spot diagram indicating the aberration manifesting in relation to the g-line in the fourth example. FIG. 19 and FIG. 20 indicate that the sizes of the spots at the various image points S1 through S9, calculated for the e-line in correspondence to the fourth example, are sufficiently small, demonstrating that uniform and robust correction of aberration is achieved over the entire image plane IM, as in the first through third examples. Furthermore, the spots at the various image points S1 through S9 each take on a substantially symmetrical shape, demonstrating that asymmetrical aberration is effectively corrected. While the sizes of the spots calculated for the g-line are somewhat greater than the spot sizes corresponding to the e-line, correction of chromatic aberration is still superior to that with a standard camera lens.

The sizes of the spots at the image points S1 through S9 calculated for the e-line in the various examples are 8 µm through 15 µm in RMS, indicating that uniform and robust correction of aberration is achieved over the entire image plane IM. In addition, the shapes of the spots at the various image points S1 through S9 are substantially symmetrical, indicating that asymmetrical aberration is properly corrected. These are critical attributes in photographic optical systems. Astro-photographers, for instance, would not want to use an optical system manifesting significant astigmatism or comatic aberration since point images formed through such optical systems are bound to appear streaky.

In the examples, the spot sizes calculated at the image points S1 through S9 for the g-line are 16 µm through 30 µm in RMS, which are somewhat greater than the spot sizes calculated for the e-line. However, chromatic aberration is still better corrected compared to chromatic aberration correction achieved for standard camera lenses. In other words, even though the optical systems achieved in the embodiment are decentered optical systems that are rotationally asymmetrical, the occurrence of asymmetrical aberration is still effectively prevented. In addition, at the optical systems achieved through the embodiment, aberration is greatly reduced over the entire 36 mm×24 mm image plane, which is relatively wide for light in the visible wavelength band.

A description has been given on an example in which the present invention is adopted in a catadioptric imaging lens that may be used in, for instance, a camera. However, the present invention is not limited to this example and may be adopted equally effectively in another appropriate type of imaging device.

The above described embodiments are examples and various modifications can be made without departing from the scope of the invention.

What is claimed is:

1. A catadioptric imaging lens, comprising:
 a first reflecting mirror, a second reflecting mirror and a lens group, with the first reflecting mirror disposed closest to an object side where an object is present, the second reflecting mirror disposed second closest to the object and the lens group disposed furthest away from the object in a positional arrangement along an optical path whereby light reflected at the first reflecting mirror is reflected at the second reflecting mirror and then travels through the lens group to form an object image at a predetermined image plane; wherein
 when a straight line connecting a center of the object and a center of the first reflecting mirror is designated as a first reference axis, a straight line connecting a center of the second reflecting mirror and a center of the image plane is designated as a second reference axis, a plane that contains the first reference axis and the second reference axis is designated as a reference plane, a plane that ranges through the center of the first reflecting mirror, is perpendicular to the reference plane and forms a first predetermined angle with the first reference axis is designated as a first orthogonal plane, a plane that ranges through the center of the second reflecting mirror, is perpendicular to the reference plane and forms a second predetermined angle with the second reference axis is designated as a second orthogonal plane, and a plane that ranges through a center of a surface in the lens group located closest to the second reflecting mirror, is perpendicular to the reference plane and is parallel to the second reference axis is designated as a third orthogonal plane:

the first reflecting mirror and the second reflecting mirror are decentered within the reference plane;

a reflecting surface of the first reflecting mirror is a rotationally asymmetrical aspherical surface, having a contour that manifests concavity on the object side within the reference plane and also within the first orthogonal plane;

a reflecting surface of the second reflecting mirror is a rotationally asymmetrical aspherical surface, having a contour that manifests convexity on a side further toward the first reflecting mirror within the reference plane and also within the second orthogonal plane; and the surface in the lens group located closest to the second reflecting mirror is a rotationally asymmetrical aspherical surface, having a contour that manifests concavity on a side further toward the second reflecting mirror within the reference plane and manifests convexity on the side further toward the second reflecting mirror within the third orthogonal plane;

each aspherical surface among the rotationally asymmetrical aspherical surfaces is defined as expressed in (1) below, when a direction along which a normal line extends at an origin point of a tangent plane to the aspherical surface is designated as a z direction, two directions extending orthogonally to each other within the tangent plane are designated as an x direction and a y direction, respectively, s represents a sag quantity indicating an extent of sagging of the aspherical surface manifesting along the z direction, c represents a curvature at the origin point, r represents a distance from the origin point, k represents a conic constant, m and n each represent an integer equal to or greater than 0, and C(m, n) represents a coefficient for a monomial $x^m \cdot y^n$, $$s = \frac{cr^2}{1 + \sqrt{1 - (1+k)c^2r^2}} + \sum_m \cdot \sum_n \{C(m, n) \cdot x^m \cdot y^n\}; \quad (1)$$

and

α3 representing a sum of the coefficient C(2, 0) of $x^2$ and a value c/2 that is half the curvature c, and β3 representing a sum of the coefficient C(0, 2) of $y^2$ and the value c/2 that is half the curvature c in relation to expression (1) defining an aspherical entry surface of the lens located closest to the second reflecting mirror among the lenses in the lens group, satisfy a condition expressed as; −4.000<β3/α3<−1.000.

2. A catadioptric imaging lens according to claim 1, wherein:
a curvature of the reflecting surface of the first reflecting mirror on the first reference axis within the reference plane is greater than a curvature within the first orthogonal plane.

3. A catadioptric imaging lens according to claim 1, wherein:
a curvature of the reflecting surface of the second reflecting mirror on the second reference axis within the reference plane is smaller than a curvature within the second orthogonal plane.

4. A catadioptric imaging lens according to claim 1, wherein:
the first reference axis and the second reference axis are parallel to each other.

5. A catadioptric imaging lens according to claim 1, wherein:
the lens group includes three lenses each comprising an entry surface and an exit surface that are rotationally asymmetrical aspherical surfaces.

6. A catadioptric imaging lens according to claim 1, wherein:
α1 representing a sum of the coefficient C(2, 0) of $x^2$ and the value c/2 that is half the curvature c, and β1 representing a sum of the coefficient C(0, 2) of $y^2$ and the value c/2 that is half the curvature c in relation to expression (1) defining the aspherical reflecting surface of the first reflecting mirror, satisfy a condition expressed as; 0.500<β1/α1<1.000.

7. A catadioptric imaging lens according to claim 1, wherein:
α2 representing a sum of the coefficient C(2, 0) of $x^2$ and the value c/2 that is half the curvature c, and β2 representing a sum of the coefficient C(0, 2) of $y^2$ and the value c/2 that is half the curvature c in relation to expression (1) defining the aspherical reflecting surface of the second reflecting mirror, satisfy a condition expressed as; 0.100<β2/α2<1.000.

8. A catadioptric imaging lens according to claim 1, further comprising:
a diffractive optical element disposed on the object side relative to the first reflecting mirror, which includes a rotationally asymmetrical aspherical diffractive optical surface.

9. A catadioptric imaging lens according to claim 8, wherein:
when a direction along which the first reference axis extends is designated as a z direction, two directions extending orthogonally to each other within a plane perpendicular to the z direction are designated as an x direction and a y direction, φ represents a phase shape at the diffractive optical surface, $\lambda_0$ represents a reference wavelength, m represents an order of diffraction, i and j are integers equal to or greater than 0, and D(i, j) represents a coefficient of a monomial $x^i \cdot y^j$, the aspherical surface at the diffractive optical surface is defined as expressed in (2) below;

$$\phi = \frac{2\pi}{m\lambda_0} \sum_i \sum_j \{D(i, j) \cdot x^i \cdot y^j\}; \quad (2)$$

α4 representing the coefficient D(2, 0) of $x^2$, and β4 representing the coefficient D(0, 2) of $y^2$, satisfy a condition expressed as;

−7.000<β4/α4<−1.000.

10. A catadioptric imaging lens according to claim 1, wherein:
the first and second predetermined angles are equal.

11. A catadioptric imaging lens, comprising:
a first reflecting mirror, a second reflecting mirror and a lens group, with the first reflecting mirror disposed closest to an object side where an object is present, the second reflecting mirror disposed second closest to the object and the lens group disposed furthest away from the object in a positional arrangement along an optical path whereby light reflected at the first reflecting mirror is reflected at the second reflecting mirror and then travels through the lens group to form an object image at a predetermined image plane; wherein when a straight line connecting a center of the object and a center of the first reflecting mirror is designated as a first reference axis, a straight line connecting a center of the second reflecting mirror and a center of the image plane is designated as a second reference axis, a plane that contains the first reference axis and the second reference axis is designated as a reference plane, a plane that ranges through the center of the first reflecting mirror, is perpendicular to the reference plane and forms a first predetermined angle with the first reference axis is designated as a first orthogonal plane, a plane that ranges through the center of the second reflecting mirror, is perpendicular to the reference plane and forms a second predetermined angle with the second reference axis is designated as a second orthogonal plane, and a plane that ranges through a center of a surface in the lens group located closest to the second reflecting mirror, is perpendicular to the reference plane and is parallel to the second reference axis is designated as a third orthogonal plane:

the first reflecting mirror and the second reflecting mirror are decentered within the reference plane;

a reflecting surface of the first reflecting mirror is a rotationally asymmetrical aspherical surface, having a contour that manifests concavity on the object side within the reference plane and also within the first orthogonal plane;

a reflecting surface of the second reflecting mirror is a rotationally asymmetrical aspherical surface, having a contour that manifests convexity on a side further toward the first reflecting mirror within the reference plane and also within the second orthogonal plane; and the surface in the lens group located closest to the second reflecting mirror is a rotationally asymmetrical aspherical surface, having a contour that manifests concavity on a side further toward the second reflecting mirror within the reference plane and manifests convexity on the side further toward the second reflecting mirror within the third orthogonal plane;

the catadioptric imaging lens further comprising:

a diffractive optical element disposed on the object side relative to the first reflecting mirror, which includes a rotationally asymmetrical aspherical diffractive optical surface, wherein:

when a direction along which the first reference axis extends is designated as a z direction, two directions extending orthogonally to each other within a plane perpendicular to the z direction are designated as an x direction and a y direction, $\phi$ represents a phase shape at the diffractive optical surface, $\lambda_0$ represents a reference wavelength, m represents an order of diffraction, i and j are integers equal to or greater than 0, and $D(i, j)$ represents a coefficient of a monomial $x^i \cdot y^j$, the aspherical surface at the diffractive optical surface is defined as expressed in (2) below;

$$\phi = \frac{2\pi}{m\lambda_0} \sum_i \sum_j \{D(i, j) \cdot x^i \cdot y^j\}; \tag{2}$$

$\alpha 4$ representing the coefficient $D(2, 0)$ of $x^2$, and $\beta 4$ representing the coefficient $D(0, 2)$ of $y^2$, satisfy a condition expressed as;

$-7.000 < \beta 4/\alpha 4 < -1.000$.

12. A catadioptric imaging lens according to claim 11, wherein:
the first and second predetermined angles are equal.

* * * * *